US011216006B2

(12) United States Patent
Soh et al.

(10) Patent No.: US 11,216,006 B2
(45) Date of Patent: Jan. 4, 2022

(54) ROBOT AND METHOD FOR LOCALIZING A ROBOT

(71) Applicant: Singapore University of Technology and Design, Singapore (SG)

(72) Inventors: Gim Song Soh, Singapore (SG); Shaohui Foong, Singapore (SG); Kevin Otto, Aalto (FI); Akash Vibhute, Singapore (SG); Kristin Wood, Singapore (SG)

(73) Assignee: SINGAPORE UNIVERSITY OF TECHNOLOGY AND DESIGN, Singapore (SG)

( * ) Notice: Subject to any disclaimer, the term of this patent is extended or adjusted under 35 U.S.C. 154(b) by 67 days.

(21) Appl. No.: 15/655,451

(22) Filed: Jul. 20, 2017

(65) Prior Publication Data

US 2018/0024561 A1      Jan. 25, 2018

Related U.S. Application Data

(60) Provisional application No. 62/364,354, filed on Jul. 20, 2016.

(51) Int. Cl.
*G05D 1/02* (2020.01)

(52) U.S. Cl.
CPC .......... *G05D 1/027* (2013.01); *G05D 1/0272* (2013.01)

(58) Field of Classification Search
CPC .............................. G05D 1/0272; G05D 1/027
See application file for complete search history.

(56) References Cited

U.S. PATENT DOCUMENTS

| 5,809,451 | A | * | 9/1998 | Parsons | B60R 21/01 |
| | | | | | 701/45 |
| 6,227,933 | B1 | * | 5/2001 | Michaud | A63H 33/005 |
| | | | | | 446/458 |
| 8,788,130 | B1 | * | 7/2014 | Tran | G05D 1/027 |
| | | | | | 701/22 |
| 2008/0059015 | A1 | * | 3/2008 | Whittaker | G08G 1/161 |
| | | | | | 701/23 |
| 2008/0084175 | A1 | * | 4/2008 | Hollis | G05D 1/0891 |
| | | | | | 318/568.12 |
| 2008/0097644 | A1 | * | 4/2008 | Kaznov | A63H 29/22 |
| | | | | | 700/245 |

(Continued)

OTHER PUBLICATIONS

Widyotriatmo; "A modified PID algorithm for dynamic control of an automatic wheelchair"; IEEE Conf. on Control System and Industrial Informatics, pp. 64-68, 2012 (Year: 2012).*

(Continued)

*Primary Examiner* — Stephen Holwerda
(74) *Attorney, Agent, or Firm* — Bracewell LLP; Brad Y. Chin

(57) ABSTRACT

According to various embodiments, there is provided a robot including: a spherical shell; a cart in the spherical shell, the cart including a plurality of wheels rotatable to move the cart along an inner surface of the spherical shell; a sensor coupled to the cart, the sensor configured to provide an inertial measurement of the cart; a motion encoder configured to measure an angular velocity of each wheel of the plurality of wheels; and a localizer configured to determine a location of the robot, based on the angular velocities of the plurality of wheels and the inertial measurement of the cart.

16 Claims, 12 Drawing Sheets

(56) References Cited

U.S. PATENT DOCUMENTS

| | | | | |
|---|---|---|---|---|
| 2011/0231013 | A1* | 9/2011 | Smoot | B62K 11/007 700/245 |
| 2012/0009845 | A1* | 1/2012 | Schmelzer | A63H 17/00 446/431 |
| 2012/0168240 | A1* | 7/2012 | Wilson | A63H 30/04 180/167 |
| 2013/0233630 | A1* | 9/2013 | Salter | A63B 43/00 180/21 |
| 2013/0261964 | A1* | 10/2013 | Goldman | G05D 1/0259 701/500 |
| 2013/0331988 | A1* | 12/2013 | Goel | G05D 1/0272 700/254 |

OTHER PUBLICATIONS

Widyotriatmo; "A modified PID algorithm for dynamic control of an automatic wheelchair"; IEEE Con. on Control System and Industrial Informatics, pp. 64-68, 2012 (Year: 2012).*

Niu; "Mechanical Development and Control of a Miniature Nonholonomic Spherical Rolling Robot"; Proc. of the 13th International Conference on Control Automation Robotics & Vision, pp. 1923-1928, 2014 (Year: 2014).*

Alves, et al.; Design and Control of a Spherical Mobile Robot; Proc. Instn Mech. Engrs vol. 217 Part I: J. Systems and Control Engineering; IMECHE, 2003; pp. 1-11.

Armour, et al.; Rolling in Nature and Robotics: A Review; Sciencedirect, Journal of Bionic Engineering (2006) vol. 3 NO. 4, pp. 195-208.

Bhattacharya, et al.; Spherical Rolling Robot: A Design and Motion Planning Studies; IEEE Transactions on Robotics and Automation, vol. 16, No. 6, Dec. 2000; pp. 835-839.

Bicchi, et al.; Introducing the Sphericle: An Experimental Testbed for Research and Teaching in Nonholonomy; IEEE International Conference on Robototics and Automation, Albuquerque, New Mexico (1997); 7 PGS.

Cai, et al.; Path Tracking Control of a Spherical Mobile Robot; Elsevier, Mechanism and Machine Theory, 51 (2012): pp. 58-73.

Camicia, et al.; Nonholonomic Kinematics and Dynamics of the Sphericle; Proceedings of the 2000 IEEE/RSJ International Conference on Intelligent Robots and Systems, Takamatsu, Japan (2000); pp. 805-810.

Chen, et al.; Design and Implementation of a Ball-Driven Omnidirectional Spherical Robot; Elsevier, Mechanism and Machine Theory, 68 (2013), pp. 35-48.

Coulter; Implementation of the Pure Pursuit Path Tracking Algorithm; Tech. Rep. CMU-RI-TR-92-01, Robotics Institute, Carnegie Mellon University, Pittsburg, PA, USA, Jan. 1992; 11 PGS.

Erdman, et al.; Advance Mechanism Design: Analysis and Synthesis; Fourth Edition, vol. 1, Prentice-Hall, Englewood Cliffs, NJ (1984); 683 PGS.

Fu, et al.; Bio-Inspired Design: An Overview Investigating Open Questions From the Broader Field of Design-by-Analogy; ASME Journal of Mechanical Design, 136(11) Dated Oct. 8, 2014, pp. 1-18.

Giesbrecht, et al.; Path Tracking for Unmanned Ground Vehicle Navigation. Technical Memorandum, DRDC Suffield TM 2005-224, Dec. 2005; 36 PGS.

Mahboubi, et al.; Design and Implementation of a Novel Spherical Mobile Robot; Journal of Intelligent Robot System, (2013) 71:43-64; pp. 43-64.

Ming, et al.; Introducing Hit Spherical Robot: Dynamic Modeling and Analysis Based on Decoupled Subsystem; Proc. of 2006 IEEE/RSJ International Conference on Robotics and Biomimetics, Dec. 17-20, 2006, Kunming, China; pp. 181-186.

Mukherjee, et al.; Motion Planning for a Spherical Mobile Robot: Revisiting the Classical Ball-Plate Problem; ASME Journal of Dynamic Systems, Measurement, and Control, 124 (4), Dec. 2002: pp. 502-511.

Niu, et al.; Mechanical Development and Control of a Miniature Nonholonomic Spherical Rolling Robot; IEEE 2014 13th International Conference on Control, Automation, Robotics and Vision, Singapore, Dec. 10-12, 2014; pp. 1923-1928.

Orbotix Inc.; Sphero Collision Detection Feature; Orbotix Communication API Dated Feb. 25, 2013; pp. 1-130; https://github.com/orbotix/DeveloperResources/zipball/master.

Otani, et al.; Position and Attitude Control of a Spherical Rolling Robot Equipped With a Gyro; AMC (2006), Istanbul, Turkey; pp. 416-421.

Roozegar, et al.; DP-Based Path Planning of a Spherical Mobile Robot in an Environment With Obstacles; Elsevier, Journal of the Franklin Institute, 351 (2014): pp. 4923-4938.

Rotundus Dated Jul. 24, 2017; http://www.rotundus.se/specifications.html; pp. 1-2.

Seeman, et al.; An Autonomous Spherical Robot for Security Tasks; CIHSPS 2006—IEEE International Conference on Computational Intelligence for Homeland Security and Personal Safety, Alexandria, VA, USA, Oct. 16-17, 2006; pp. 51-55.

SPHERO 2.0—SPHERO Store, Product, Dated Jul. 24, 2017; https://store.sphero.com/products/sphero-2-0; pp. 1-13.

Yoon, et al.; Spherical Robot With New Type of Two-Pendulum Driving Mechanism; INES2011, 15th, IEEE International Conference on Intelligent Engineering Systems, Jun. 23-25, 2011, Poprad, Slovakia; pp. 275-279.

Zhan, et al.: Dynamic Trajectory Planning of a Spherical Mobile Robot; IEEE Robotics and Mechanisms Conference, Bangkok, Thailand (2006); 6 PGS.

Zhao, et al.; Dynamics and Motion Control of a Two Pendulums Driven Spherical Robot; The 2010 IEEE/RSJ International Conference on Intelligent Robots and Systems, Oct. 18-22, 2010, Taipei, Taiwan; pp. 147-153.

Zheng, et al.; Control of a Spherical Robot: Path Following Based on Nonholonomic Kinematics and Dynamics; Elsevier; CJA 24 (2011); pp. 337-345.

\* cited by examiner

| Sr. No. | Function block | Execution rate |
|---|---|---|
| 1 | Bluetooth command parser | 30 Hz |
| 2 | IMU Filter | 750 Hz |
| 3 | Encoder filter - Left | 750 Hz |
| 4 | Encoder filter - Right | 750 Hz |
| 5 | Kinematic localization | 1000 Hz |
| 6 | Pure-pursuit controller | 100 Hz |
| 7 | PID controller - Left | 50 Hz |
| 8 | PID controller - Right | 50 Hz | ical Field

Various embodiments relate to robots and methods for localizing a robot.

BACKGROUND

Autonomous systems, such as robots, are increasingly being miniaturized to suit a multitude of applications. The ability to navigate is an essential element of autonomous systems. In order to navigate, the autonomous systems need to know their locations. Existing technologies for localization include Global Positioning System (GPS), WiFi and beaconing. The high level of power consumption of these existing technologies render them unsuitable for use on miniature robots which cannot carry large-capacity batteries. There is a need to lower the power consumption of localization technologies so that these robots can operate for long hours without having to re-charge.

SUMMARY

According to various embodiments, there may be provided a robot including: a spherical shell; a cart in the spherical shell, the cart including a plurality of wheels rotatable to move the cart along an inner surface of the spherical shell; a sensor coupled to the cart, the sensor configured to provide an inertial measurement of the cart; a motion encoder configured to measure an angular velocity of each wheel of the plurality of wheels; and a localizer configured to determine a location of the robot, based on the angular velocities of the plurality of wheels and the inertial measurement of the cart.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1A:
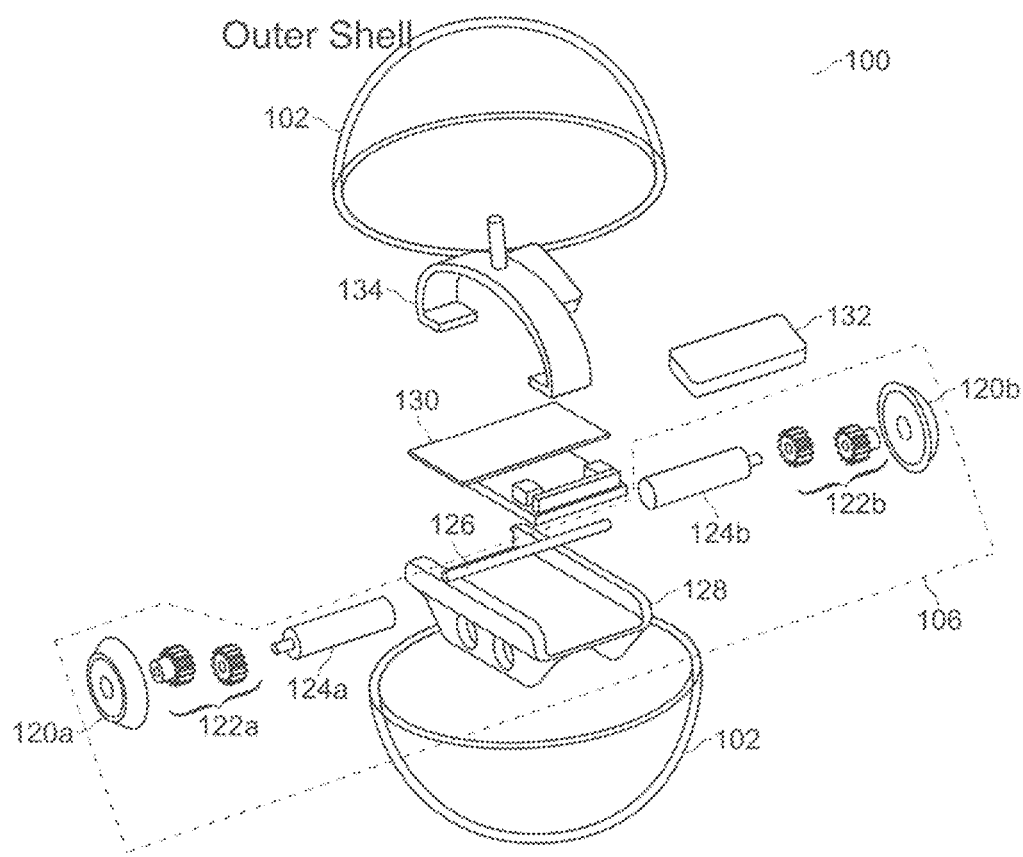
FIG. 1A shows an exploded view of a robot according to various embodiments.

Embodiments described below in context of the devices are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

In this context, the robot as described in this description may include a memory which is for example used in the processing carried out in the robot. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "controller" may be understood as any kind of a logic implementing entity, which may be special purpose circuitry or a processor executing software stored in a memory, firmware, or any combination thereof. Thus, in an embodiment, a "controller" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "controller" may also be a processor executing software, e.g. any kind of computer program, e.g. a computer program using a virtual machine code such as e.g. Java. Any other kind of implementation of the respective functions which will be described in more detail below may also be understood as a "controller" in accordance with an alternative embodiment.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

In order that the invention may be readily understood and put into practical effect, various embodiments will now be described by way of examples and not limitations, and with reference to the figures.

In the context of various embodiments, the term "robot" may refer to a device that is capable of autonomous navigation.

According to various embodiments, an autonomous device, also referred herein as a robot, may be provided. The robot may be spherical in shape and may move around by rolling. The spherical shape may provide the robot to possess a high degree of mobility. The robot may be able to rapidly change its direction of movement, i.e. possesses omnidirectional planar mobility. The spherical shell may offer natural dynamic dampening in collisions as well as smooth two-dimensional surface navigation. The spherical shell may be formed of a durable and hardened material such that the robot may be deployed in hazardous environments or uneven terrain. The robot may travel by at least one of these techniques, including (a) changing the position of the center of mass to manipulate gravity effects; (b) running a small structure on the internal surface of the sphere to drive directly; and (c) inducing roll from angular momentum through the internal actuators installed on radial spokes of the sphere.

A conventional robot may employ active transmission sensors such as GPS or WiFi to determine their positions. The conventional robot may also use an inertial sensor for pitch control. Without the active transmission sensors, the conventional robot may not be able to determine its position. Even if the conventional robot were to use the pitch measurement to determine its position, the determination of the position would become inaccurate over time, as inaccuracies in the position determination would accumulate over time. In other words, the conventional robot may determine its position in an open loop, if it does not include any active transmission sensors to provide closed-loop feedback.

According to various embodiments, the robot may estimate its position based on inertial measurements and odometry data. The inertial measurements may include a pose estimate relative to a global reference frame, for example heading of the robot. The odometry data may include information on distance moved by the robot. The robot may exclude range sensors such as ultrasonic or infrared sensors, or navigation sensors such as GPS, to minimize the size and the weight of the robot. The robot may include an inertial measurement unit (IMU) configured to provide the inertial measurements, and a motion sensor configured to provide the odometry data. The robot may further include a first filter to process the inertial measurements, and a second filter to process the odometry data. In spite of the lack of range sensors and navigation sensors to refine the localization data, the robot may be able to localize itself accurately based on only information from the IMU and the motion sensor by using a localizer to determine the location of the robot based on the filtered inertial measurements, the filtered odometry data and a kinematic model. The localizer may continuously, or in other words, regularly update the position of the robot. The robot may further include a velocity controller configured to compute the velocity of the robot, or the velocities of the wheels of the robot, required to move the robot to a commanded waypoint. The velocity controller may compute the velocity based on the kinematic model and the regularly updated location of the robot. In other words, the output of the localizer may provide feedback to the velocity controller. The robot may further include a Kalman filter. The Kalman filter may provide corrections to the localization data, to minimize the effects of wheel slips, collisions or any other scenario where measurements from the wheel encoders may be compromised.

According to various embodiments, a method for determining the position, in other words, localization of a moving spherical shell may be provided. The method may extract accurate localization data out of inaccurate IMU and wheel encoder measurements. The IMU and the wheel encoders may be mounted on a drive cart that moves within the spherical shell. The drive cart may be freely movable within the spherical shell. The drive cart may include a plurality of wheels, for example a left wheel and a right wheel. Each wheel of the drive cart may be independently operable, for example, to rotate at different rotational velocities. The wheel encoder may measure the relative displacement between the wheel and the inner surface of the spherical shell, based on the rotational velocities of the wheels. The heading and displacement of the spherical shell can be identified using the IMU readings as a global reference in combination with the wheel encoder measurements. The location of the moving spherical shell may thus be determined. The method may assume that the localization of the moving spherical shell is nonholonomic. The moving spherical shell may be a robot.

FIG. 1A shows an exploded view of a robot 100 according to various embodiments. The robot 100 may include an outer shell 102 and a plurality of internal components housed within the outer shell 102. The outer shell 102 may be a closed spherical shell. The internal components may include a circuit board 130, a cart 106, a battery 132, a chassis 128 and a support frame 134. The cart 106 may be configured to move within the outer shell 102, so as to change the center of mass of the robot 100 and thereby cause the robot 100 to roll. The cart 106 may include an axle 126, a chassis 128, a left wheel mechanism and a right wheel mechanism. The axle 126 may connect the left wheel mechanism to the right wheel mechanism. The left wheel mechanism may include a left motor 124a, a left drive train 122a and a left wheel 120a. The left drive train 122a may couple the left motor 124a to the left wheel 120a, such that drive transmission from the left motor 124a may be translated into rotation of the left wheel 120a. The left drive train 122a may include a plurality of gears. The right wheel mechanism may be identical to, or at least substantially similar to the left wheel mechanism. The right wheel mechanism may include a right motor 124b, a right drive train 122b and a right wheel 120b. The circuit board 130 may include a sensor and a processor. The circuit board 130 may be an integrated circuit chip. The sensor may include an IMU. The sensor may estimate at least one of an orientation or position of the robot 100. The processor may be a microprocessor. The processor may include a microcontroller unit (MCU). The processor may control the left motor 124a and the right motor 124b, at least partly based on output of the sensor. The battery 132 may provide electricity to the circuit board 130 and the cart 106. The chassis 128 may serve as a base frame for the cart 106 and may provide mechanical support to the cart 106. The chassis 128 may also serve as a holder for all of the internal components of the robot 100. The circuit board 130 may be coupled to the cart 106 via the chassis 128. The support frame 134 may couple the circuit board 130 to the outer shell 102, to minimize vibrations of the circuit board 130.

Figure 1B:
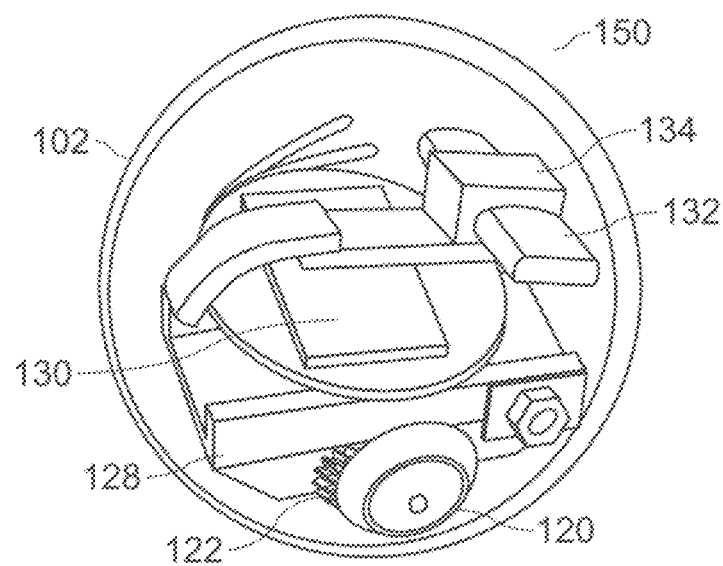
FIG. 1B shows a photograph of the robot of FIG. 1A.

FIG. 1B shows a photograph 150 of the robot 100. The robot 100 may include an optical payload housed within the outer shell 102. The optical payload may be configured to record imagery or videos of an external environment of the robot 100. The outer shell 102 may be at least partially light permeable, so that the optical payload is able to receive light from outside of the robot 100.

Figure 2A:
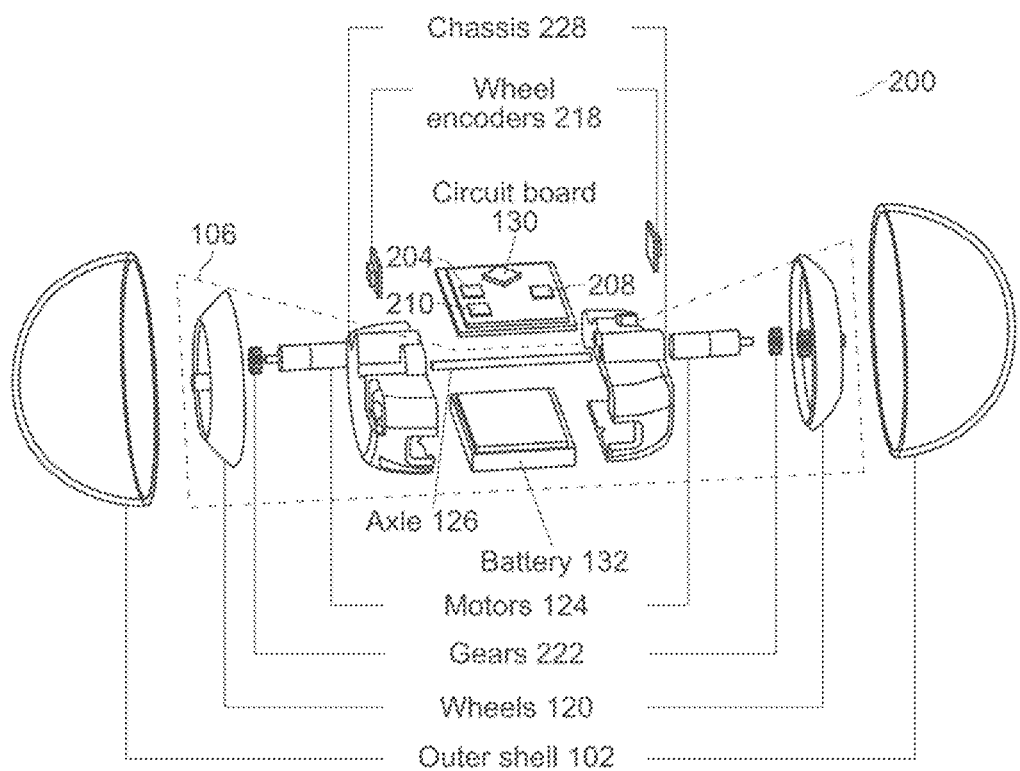
FIG. 2A shows an exploded view of a robot according to various embodiments.

FIG. 2A shows an exploded view of a robot 200 according to various embodiments. The robot 200 may be similar to the robot 100 in that it also includes an outer shell 102, a cart 106, a circuit board 130 and a battery 132. In addition to the components of the robot 100, the robot 200 may further include wheel encoders 218. The circuit board 130 may include a sensor 204, a motion encoder 208 and a localizer 210. The motion encoder 208 and the localizer 210 may be software modules executable on a processor of the circuit board 130. The processor may be an embedded controller.

The cart 106 may be the motion mechanism of the robot 200, in that the cart 106 drives the rolling motion of the robot 200. The cart 106 may move along an inner surface of the outer shell 102, thereby changing the center of mass of the robot 200. The robot 200 may roll as a result of the change in its center of mass. The cart 106 may include a pair of wheels 120, gears 222, a pair of motors 124, an axle 126 and a chassis 228. The chassis 228 may serve as a frame to hold the components of the cart together. The chassis 228 may further serve to support the circuit board 130 and the battery 132. The chassis 228 may be shaped to interlock or fit together with the plurality of internal components. The axle 126 may couple a left wheel of the pair of wheels 120 to a right wheel of the pair of wheels. The axle 126 may serve as a suspension for the wheels 120, in other words, the axle 126 may absorb vibrations experienced by the wheels 120 as the wheels 120 travel across uneven surfaces. The axle 126 may also serve to align the position of the wheels 120. The pair of motors 124 may include a left motor and a right motor. The gears 222 may mechanically couple each motor 124 to its respective wheel 120. Each motor 124 may be controllable independently from the other motor. In other words, the left wheel and the right wheel may be controlled independently, such that the left wheel may move at a different velocity from the right wheel. In other words, the cart 106 may be a differential cart. By controlling the wheels independently, the cart 106 may be able to make turning maneuvers.

The wheel encoders 218 may include a left wheel encoder and a right wheel encoder. Each wheel encoder 218 may be coupled to a respective wheel 120. Each wheel encoder 218 may be configured to measure an amount of rotation made by its respective wheel 120. The wheel encoder 218, or the motion encoder 208, may determine the amount of distance travelled by the wheels 120, based on the measured amount of rotation. The wheel encoder 218 may measure an amount of rotation made by the wheels 120. The motion encoder 208 may receive the rotation measurement from the wheel encoder 218, to estimate the amount of distance travelled. The motion encoder 208 may also include an encoder filter that smoothens the raw readings provided by the wheel encoder 218. The encoder filter may also convert the raw readings from an analog signal to a digital signal that clearly shows changes in states. The wheel encoders may generate an analog signal based on received reflections off a surface that the wheel travels on. The robot 200 may further include a wheel encoder filter to convert the analog signal into a digital signal. The wheel encoder filter may further identify change of states in the digital signal. The sensor 204 may include an IMU and a sensor filter. The sensor filter may be configured to smooth the unstable raw inertial measurements of the IMU, to provide a clean pose estimate. The clean pose estimate may include the yaw and pitch of the cart 106. The localizer 210 may be configured to compute the cart orientation and distance travelled through using data from the sensor 204, the wheel encoders 218 and the motion encoder 208. The localizer 210 may determine the location of the robot based on an angular velocity of the outer shell 102. The localizer 210 may determine the angular velocity of the outer shell 102 based on an inner radius of the spherical shell, radius of each wheel of the plurality of wheels and angular velocities of each wheel of the plurality of wheels.

The outer shell 102 may be less than 150 mm in diameter, for example, between about 50 mm to about 100 mm in diameter, for example about 60 mm in diameter. The outer shell 102 may be transparent, for example, to house an optical sensor or a visual odometry device. The various components may be packaged together into a compact design held together by the chassis 228. The robot 200 may be a light weight device weighing at less than 150 grams, for example, between 100 grams and 50 grams, for example about 60 grams. Various components, for example, the outer shell 102, the wheels 120 and the chassis 228 may be produced by 3D printing.

Figure 2B:
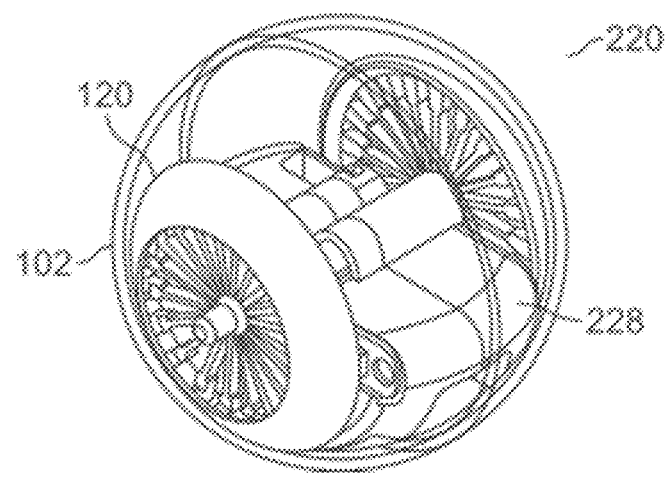
FIG. 2B shows an illustration of the robot of FIG. 2A.

FIG. 2B shows an illustration 220 of the robot 200.

Figure 3:
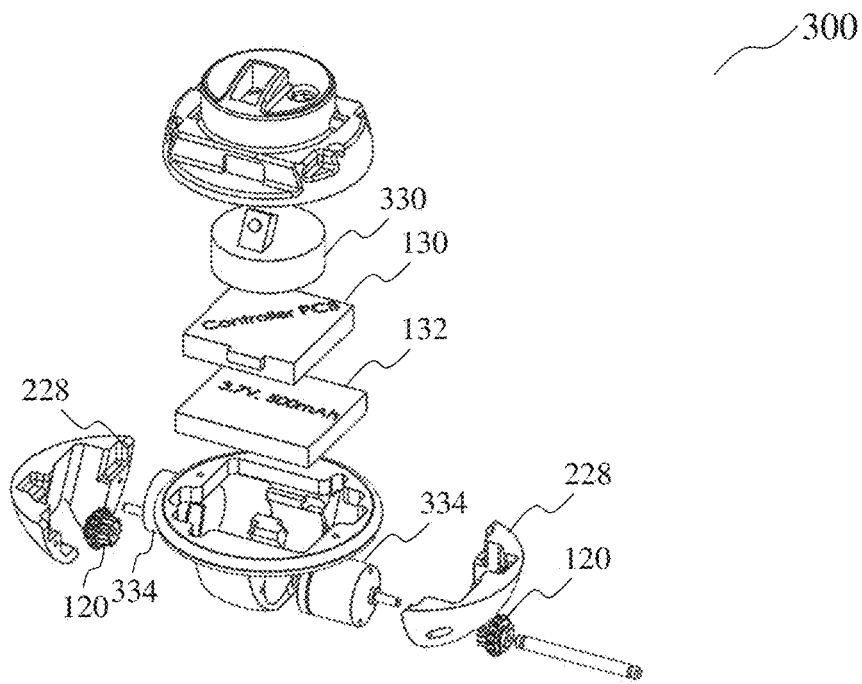
FIG. 3 shows an exploded view of a robot according to various embodiments.

FIG. 3 shows an exploded view of a robot 300 according to various embodiments. The robot 300 may be at least substantially similar to the robot 200. Compared to the robot 200, the robot 300 may further include a payload 330. The payload 330 may be a surveillance sensor such as a camera, a sound recorder, a radar or other forms of transceiver. The payload 330 may be configured to record mission data when the robot is deployed for a mission. The outer shell 102 may be at least substantially transparent so that the payload 330 may be able to record images of the external environment of the robot 300 through the outer shell 102. The robot 300 may also include a wheel member 334 for each wheel 120. The wheel member 334 may include a wheel encoder 218 and may further include the motor 124.

Figure 4:
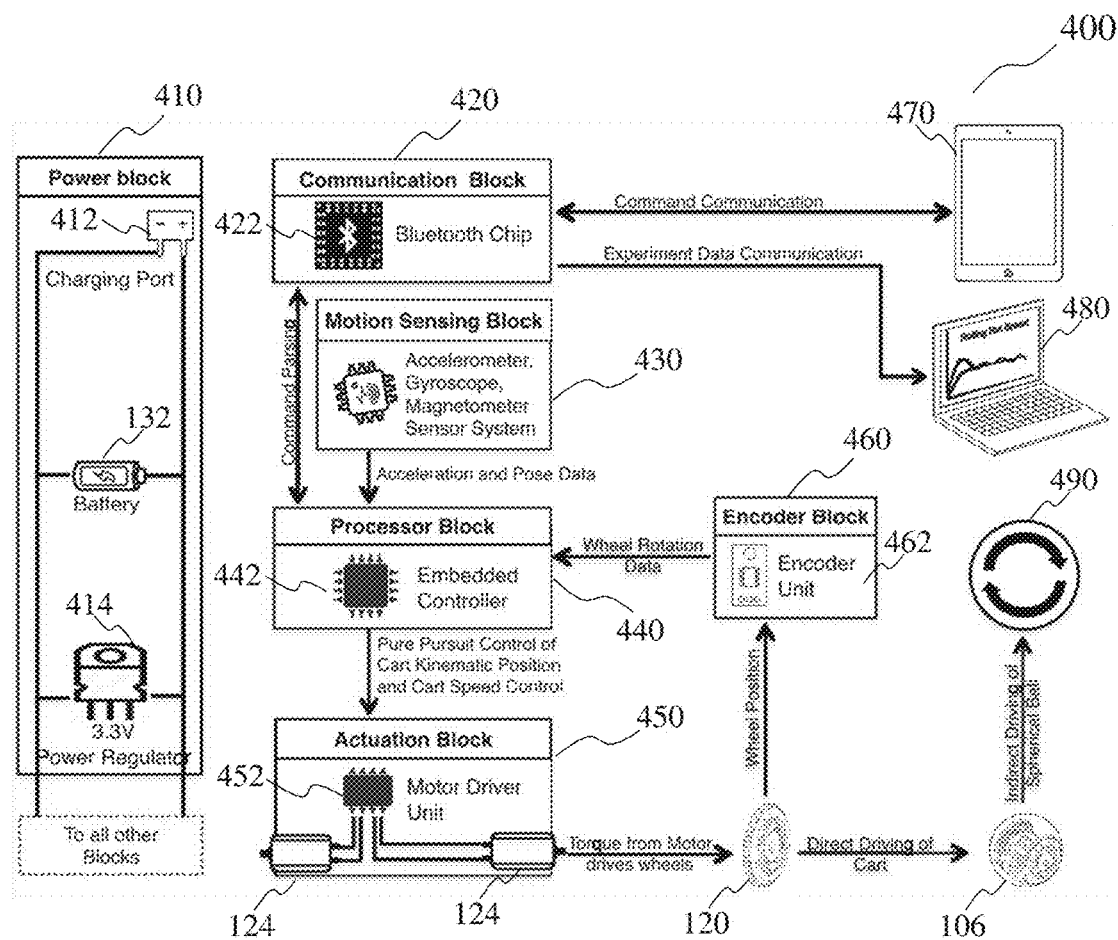
FIG. 4 shows a block diagram of a control and communication architecture of a robot according to various embodiments.

FIG. 4 shows a block diagram of a control and communication architecture 400 of a robot 490 according to various embodiments. The robot 490 may be any one of the robots 100, 200, 300 or 490. The control and communication architecture 400 may include a power block 410, a communication block 420, a motion sensing block 430, a processor block 440, an actuation block 450 and an encoder block 460.

The power block 410 may provide electricity to all electrical components of the robot, including the power block 410, the communication block 420, the motion sensing block 430, the processor block 440, the actuation block 450 and the encoder block 460. The power block 410 may include the battery 132. The power block 410 may further include a charging port 412 and a power regulator 414. The charging port 412 may be configured to connect the battery 132 to any power source, such as power mains or another battery, for recharging the battery 132. The charging port 412 may connect the battery 132 to the power source, via wired charging means, such as a power cable. The charging port 412 may include the wired means. The charging port 412 may also connect the battery to the power source wirelessly, for example, through inductive power transfer. The charging port 412 may include a wireless charging means, for example, a receiver coil, configured to receive power through induction. The power regulator 414 may maintain a constant power or a constant voltage output from the battery 132.

The communication block 420 may be configured to receive uplink data from a user interface device 470 and/or to transmit downlink data to the user interface device 470. The communication block 420 may include a wireless transceiver 422. The wireless transceiver 422 may receive and transmit electromagnetic signals, for example Bluetooth signals, radio WiFi signals or infrared signals. The communication block 420 may serve as a datalink of the robot 490. The uplink data may include user commands. The user commands may carry information on how the robot 490 should perform its mission, for example, waypoints that the robot 490 should travel to, or commands to operate the payload 330. The system data may carry information on the operational status of the robot 490, for example location or orientation of the robot 490. The system data may also include recordings made by the payload 330, for example imagery or sound. The user interface device 470 may be a computing device, such as a personal computer, a tablet computer or a mobile phone. The user interface device 470 may serve as a remote controller or a control station for a user to provide his inputs for controlling the robot. The user interface device 470 may also serve as a viewing device for the user to view data recorded by the payload of the robot. The communication block 420 may be further configured to transmit experiment data to a test station 480. The experiment data may include detailed status reports, a record of all messages sent between the blocks and a record of all technical failures. The test station 480 may be a computing device capable of downloading the experiment data and analyzing the experiment data. The communication block 420 may be further configured to receive the system data or the payload data from the processor block 440 and/or transmit user commands to the processor block 440.

The motion sensing block 430 may include the sensor 204. The sensor 204 may include at least one of an accelerometer, a gyroscope or a magnetometer. The motion sensing block 430 may measure acceleration and pose of the cart 106.

The processor block 440 may be part of the circuit board 130. The processor block 440 may include an embedded controller 442. The processor block 440 may include the localizer 210, which may run on the embedded controller 442. The processor block 440 may receive the acceleration and pose data from the motion sensing block 430. The processor block 440 may also receive wheel rotation data from the encoder block 460. The processor block 440 may determine the position of the robot, as well as the values of the parameters for controlling the wheels, based on the received acceleration and pose data and the received wheel rotation data. The processor block 440 may also perform other computational tasks such as processing payload data and controlling the payload operation.

The actuation block 450 may include a motor driver unit 452. The motor driver unit 452 may be configured to drive, or operate the motors 124. The motors 124 may then provide torque to the wheels 120.

The encoder block 460 may include an encoder unit 462. The encoder unit 462 may be configured to measure rotation of the wheels 120, based on wheel position received from the wheel 120. The wheels 120 may drive the cart 106 to move on the inner surface of the outer shell 102. The robot 490 may roll as a result of the motion of the cart 106.

In the following, the control and communication architecture 400 is explained through an illustrative and by no means limiting example. Take for example, a user wishes to deploy the robot 490 in an urban operation. The robot 490, owing to its small compact build, may be inconspicuous for such an operation. The user may input commands using the user interface device 470, for the robot 490 to carry out a surveillance mission at coordinates (x, y). These user commands may contain the waypoint information, i.e. the coordinates (x,y), and payload commands such as commands to switch on the payload 330 at coordinates (x,y). These user commands may be transmitted by the user interface device 470 to the communication block 420. The communication block 420 may receive the user commands through its wireless transceiver 422. The communication block 420 may parse the user commands, and send parsed commands to the processor block 440 and/or the payload 330. The user command received at the communication block 420 may include a header indicating the destination of the command. The communication block 420 may transmit the user command relating to the waypoint to the processor block 440, and may transmit the user command relating to the payload to the payload 330. The processor block 440 may determine the trajectory required to arrive at the waypoint, as well as compute the respective rotational velocities of the wheels required for the robot 490 to travel along the determined trajectory. The actuation block 450 may receive the computed rotational velocities of the wheels from the processor block 440. The motor driver unit 452 may command the motors 124 to rotate the wheels 120 at their respective required rotational velocities. When the wheels 120 rotate, the cart 106 may run inside the outer shell 102 and thereby cause the robot 490 to roll.

As the robot 490 rolls on the ground, towards the waypoint, the localizer 210 may periodically update the real-time location of the robot 490. The localizer 210 may reside in the processor block 440 and may run on the embedded controller 442. The encoder block 460 may periodically monitor the amount of rotation made by the wheels 120. The encoder block 460 may provide the wheel rotation data to the processor block 440. The motion sensing block 430 may also periodically provide pose estimates to the processor block 440. In this context, "periodically" may occur at a high frequency such that to a human user, it appears that the process is continuous. The processor block 440 may combine the pose estimates and the wheel rotation data with a kinematic model stored within the processor block 440, to compute the real-time location of robot 490. The processor block 440 may report the real-time location to the user interface device 470 via the communication block 420. Thus, the user may track the location of the robot through the user interface device 470. For example, a map application of the user interface device 470 may display the location of the robot on a map as a dynamic marker.

When the real-time location of the robot 490 matches the commanded waypoint (x,y), the processor 440 may send instructions to the actuation block 450 to cease operation of the motors 124. As a result, the wheels 120 may stop rotating. The rolling motion of the robot 490 may thus come to a stop. The payload 330 may begin operations, for example to capture images. The payload 330 may transmit the captured images to the communication block 420 with minimal time delay. The communication block 420 may then send the captures images to the user interface device 470. The user may thus be able to view real-time streaming of the images through the user interface device 470. At the end of the operations, the battery level of the robot 490 may be low. The battery status may be part of the uplink data transmitted from the communication block 420 to the user interface device 470. The user may input commands for the robot 490 to head to the nearest charging point. Alternatively, the locations of available charging points may be stored within a memory of the robot 490. The processor 440 may direct the robot 490 to the nearest charging point when it receives data from the power block 410, that the battery power level is low.

Figure 5:
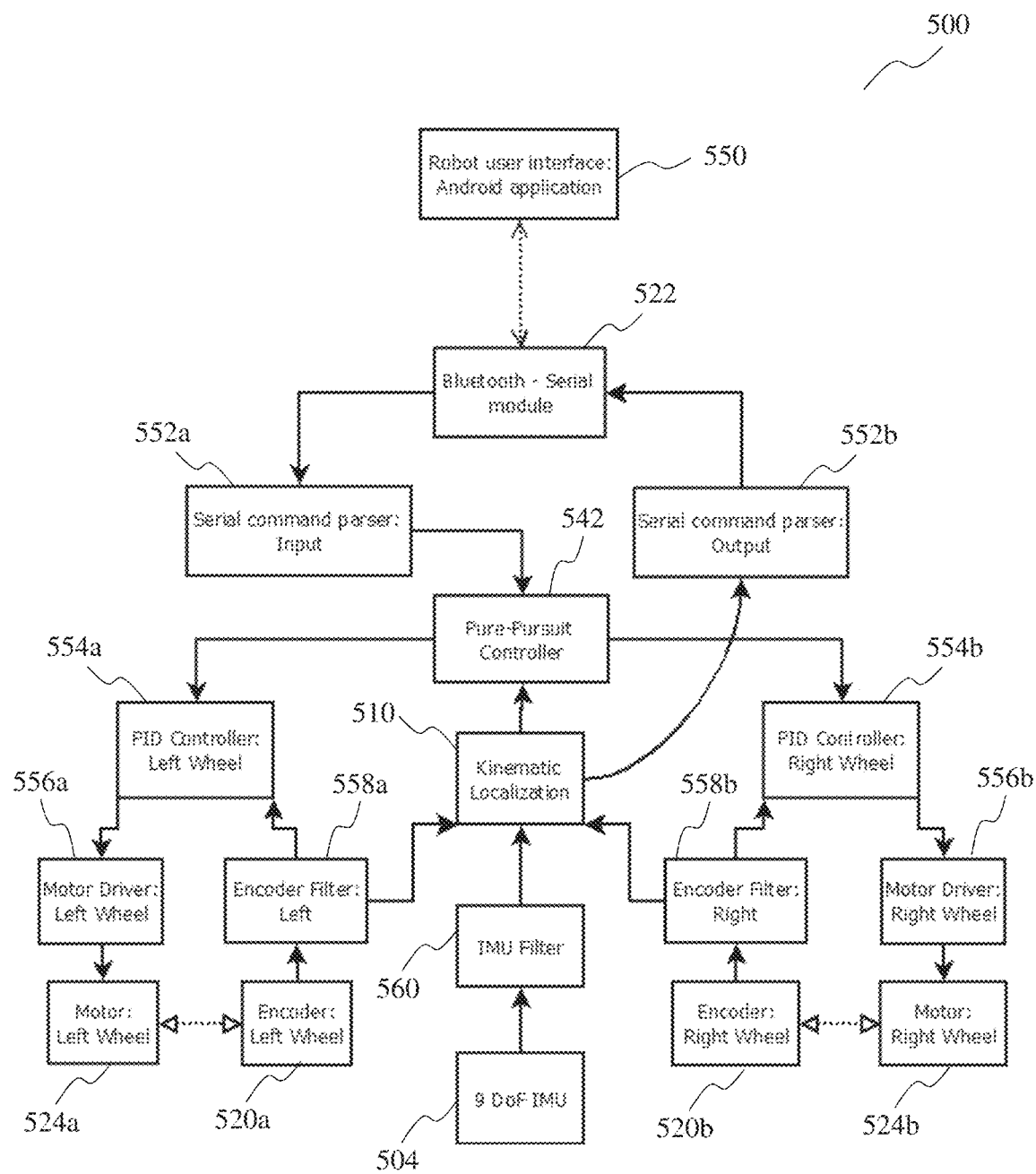
FIG. 5 shows a block diagram of the system architecture of the robot of FIG. 4.

FIG. 5 shows a block diagram of the system architecture 500 of the robot 490. The robot 490 may include a communication block 420. The communication block 420 may include a Bluetooth module 522, for example a RN42 radio. The Bluetooth module 522 may be part of the wireless transceiver 422. The Bluetooth module 522 may be configured to wirelessly receive or transmit data with a user interface application 550. Alternatively, the Bluetooth module 522 may be replaced by other radio transceivers that receive and transmit at other radio frequencies. The Bluetooth module 522 may also be replaced by infrared, WiFi or optical transceivers. The user interface application 550 may be configured to run on the user interface device 470. The user interface application 550 may be a mobile application, for example, designed to run on the Android operating system or the iOS. The user interface application 550 may also be designed to run on personal computer operating systems such as Microsoft Windows, Linux or MacOS.

The communication block 420 may further include a command parser. The command parser may include an input command parser 552a. The input command parser 552a may be configured to convert raw data strings received from the wireless transceiver 422 or the Bluetooth module 522, to commands that are understandable to the various components of the robot 490 such as the processor block 440 or the payload 330. The command parser may also include an output command parser 552b. The output command parser 552b may be configured to translate data from various components of the robot 490, such as the processor block 440, to messages for transmission to the user interface application 550.

The robot may include an IMU 504. The IMU 504 may form part of the sensor 204, or may include the sensor 204. The IMU 504 may be part of the motion sensing block 430. The IMU 504 may include an accelerometer, a gyroscope and a magnetometer. The IMU 504 may be a 9-DOF IMU, in other words, each of the accelerometer, gyroscope and magnetometer may be capable of sensing in three axes. The IMU 504 may further include a digital motion processor (DMP) on chip. The DMP may compute the pose of the robot, based on readings from the three-axis accelerometer, the gyroscope and the magnetometer. The pose may be expressed as a quaternion. A possible choice for the IMU 504 may be MPU9150 from Invensense. The pose information computed by the IMU 504 may be unstable for highly dynamic systems such as the robot 490.

The robot 490 may further include an IMU filter 560. The IMU filter 560 may receive the pose information from the IMU 504, and may process the pose information to generate a processed pose estimate. The IMU filter 560 may provide the processed pose estimate to a kinematic localization block 510. The kinematic localization block 510 may be part of, or may include, the localizer 210. IMU filter 560 may include a moving average bandpass filter. The moving average bandpass filter may process the unstable pose information from the IMU 504, to provide the processed pose estimate. The IMU filter 560 may be implemented as part of the motion sensing block 430, or the processor block 440.

The robot 490 may further include a left wheel encoder 520a and a right wheel encoder 520b, which may form part of the encoder block 460. The left wheel encoder 520a and the right wheel encoder 520b may be part of the wheel encoder 218. The left wheel encoder 520a may measure the amount of rotation of the left wheel 120a. The right wheel encoder 520b may measure the amount of rotation of the right wheel 120b. Each wheel encoder may include a miniature line sensor. The wheel encoders 520a, 520b may be mounted close to their respective wheels 120. While an incremental encoder may provide more accurate measurements for dynamic systems, the wheel encoders 520a, 520b may include the miniature line sensors instead, to reduce the cost and size of the robot 490. The miniature line sensors may generate an analog signal based on whether or not they sense a reflective surface. The generated analog signal may be noisy and may not have a clearly defined threshold which would describe the state of the wheel 120.

Each wheel encoder may be coupled to an encoder filter. The left encoder filter 558a may generate digital pulses (also referred herein as encoder pulses) based on the analog signal generated by the left wheel encoder 520a. The right encoder filter 558b may generate digital pulses based on the analog signal generated by the right wheel encoder 520b. By doing so, the encoder filters 558a, 558b may improve the reliability of the encoder data. The encoder filters 558a, 558b may provide the digital pulses to the wheel controllers 554a, 554b and the kinematic localization block 510.

The kinematic localization block 510 may be configured to fuse the encoder pulses with the processed pose estimate to obtain an estimate of the location of the robot in absence of wheel slip. The estimated location may be more accurate than estimating the location purely based on the pose information obtained directly from the IMU 504. The kinematic localization block 510 may determine the velocity of the robot based on a pitch measurement in the processed pose estimate, and further based on velocities of the wheels in the encoder data. The kinematic localization block 510 may determine the estimated location of the robot based on the determined velocity of the robot and further based on the processed pose estimate.

The robot may further include a pure-pursuit controller 542. The pure-pursuit controller 542 may use the estimated location from the kinematic localization block 510, and the command target goal received from the command parser, to generate left and right wheel velocities. The pure-pursuit controller 542 may pass information on the generated left wheel velocity and the generated right wheel velocity to the wheel controllers 554a, 554b.

The wheel controllers 554a, 554b may be proportional-integral-derivative (PID) controllers. The left wheel controller 554a may control the velocity of the left wheel 120a via a left motor driver 556a, while the right wheel controller 554b may control the velocity of the right wheel 120b via a right motor driver 556b. The wheel controllers 554a, 554b may work in a closed loop with the wheel encoders 520a, 520b and the motor drivers 556a, 556b to maintain the individual wheel velocities at the commanded values. The left motor driver 556a may drive the left motor 524a, while the right motor driver 556b may drive the right motor 524b. The left motor 524a may then cause the left wheel 120a to rotate, while the right motor 524b may cause the right wheel 120b to rotate.

The wheel controllers 554a, 554b may include a special form of Feed-forward PID algorithm which controls the velocity of the respective wheel based on input command from the pure-pursuit controller 542. The wheel controllers 554a, 554b may include an additional feed-forward term based on the velocity constant $K_v$ of the motors 524a, 524b. The additional feed-forward term may help attain the setpoint quickly as the wheel controllers 554a, 554b may only need to correct for minor deviations from the input command. The control law may be expressed as follows:

$$u = K_v v_{cmd} + K_p e + K_i \int e \, dt + K_d \dot{e} \tag{1}$$

where $K_p$, is the coefficient of the proportional term, $K_i$ is the coefficient of the integral term, $K_d$ is the coefficient of the derivative term. e is the error in velocity measured as the difference between command velocity $v_{cmd}$ and feedback velocity $v_{enc}$ measured by the wheel encoders 520a, 520b, as expressed in Equation (2):

$$e = v_{cmd} - v_{enc} \tag{2}$$

Figures 6, 7:
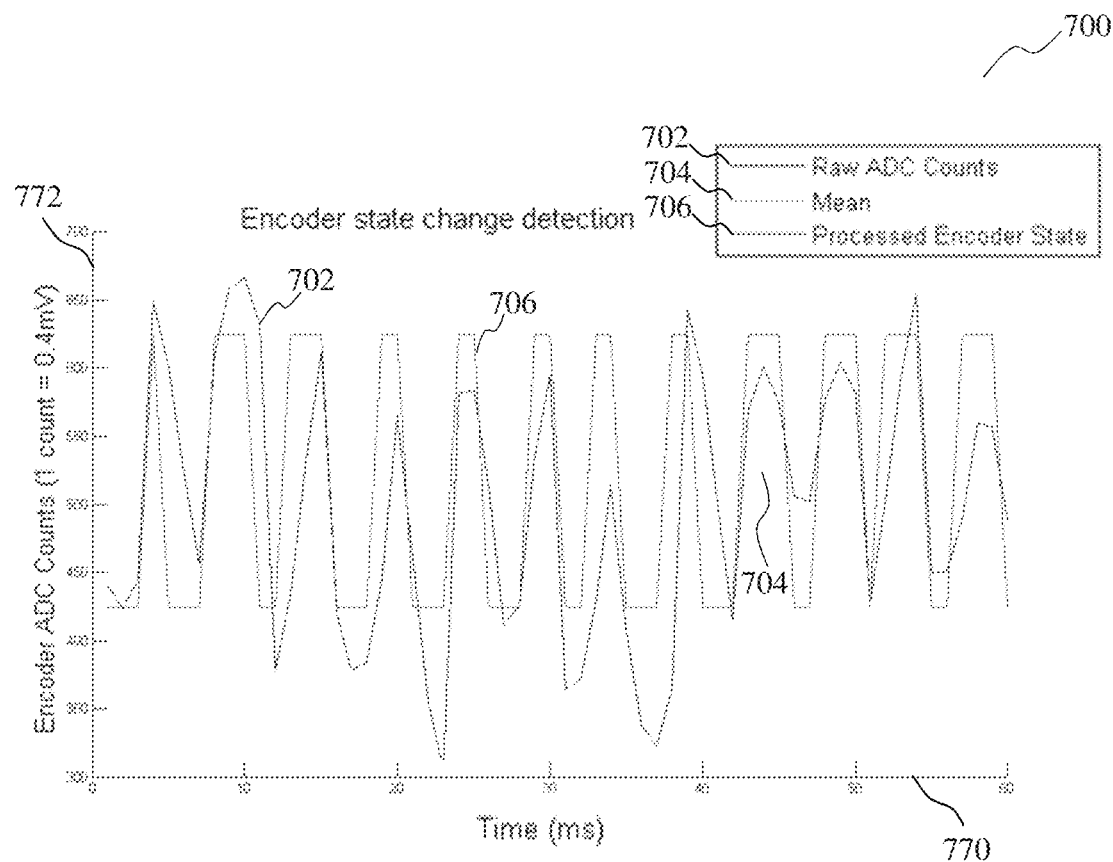
FIG. 6 shows a table that lists preset frequencies of the function blocks of the system architecture of FIG. 5.
FIG. 7 shows a graph that shows the raw encoder signal and the processed encoder state.

FIG. 6 shows a table 600 that lists preset frequencies of the function blocks of the system architecture 500. The table 600 includes a function block column 660. The function block column 660 lists various function blocks of the robot. The table 600 also includes an execution rate column 662. The execution rate column 662 lists the preset frequency of execution of the various function blocks of the robot. The various function blocks may execute in sync to govern the performance of the robot. The data execution rates may be adjusted according to the priorities of the individual function blocks, so that the various function blocks may run smoothly even if the processor hardware has limited memory for multi-threading. For example, the kinematic localization block 510 may have the highest priority and thus, the highest execution rate.

FIG. 7 shows a graph 700 that shows the raw encoder signal and the processed encoder state. The graph 700 includes a horizontal axis 770 that indicates time in milliseconds, and a vertical axis 772 that indicates encoder analog-digital-converter (ADC) counts. Each count may be equivalent to 0.4 mV. The graph 700 includes a first plot 702 representing the raw ADC counts, a line 704 representing the mean value of the raw ADC counts, and a second plot 706 representing the processed encoder state. The motors 124 of the robot may be direct current (DC) motors. The encoder block 460 may use a moving average filter to smoothen the output of the ADC to generate the raw ADC counts of the first plot 702. The encoder block 460 may differentiate the first plot 702 to generate the processed encoder state of the second plot 706. The encoder block 460 may determine state changes based on the switching between the maximum amplitude and the minimum amplitude in the second plot 706. In other words, toggling of the amplitude between the maximum value and the minimum value indicates a change in state. The processed encoder state may be deduced from the ADC signal differential rather than a preset threshold.

Figure 8:
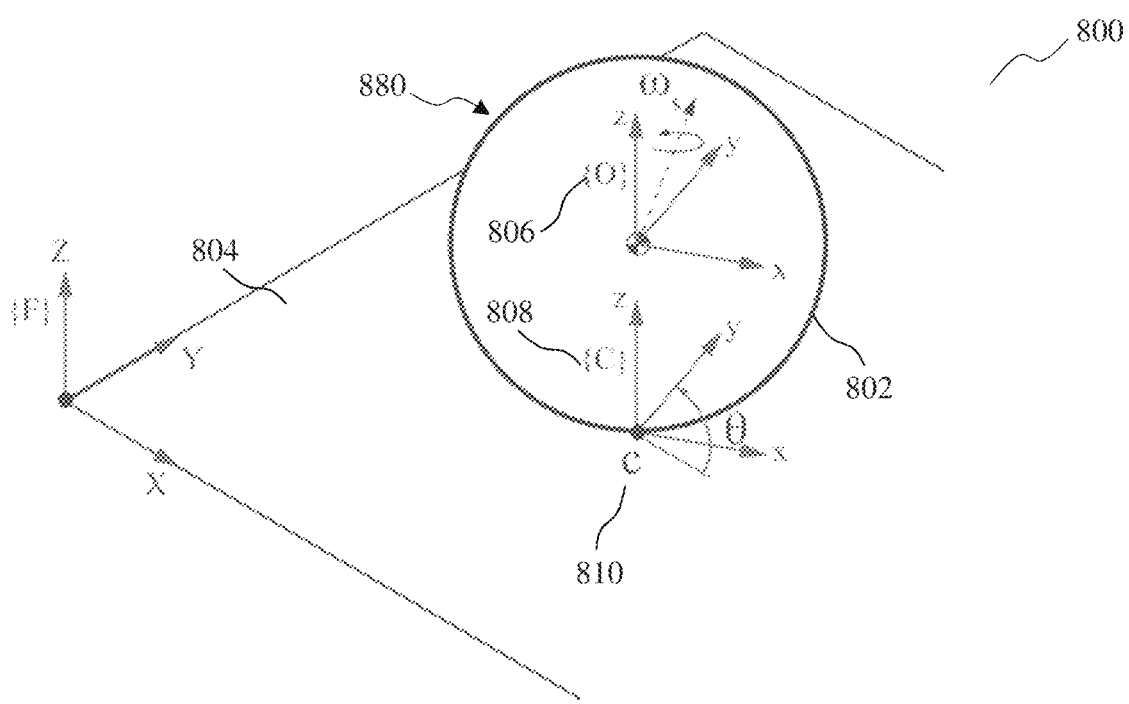
FIG. 8 shows a diagram illustrating motion of a sphere on a plane.

FIG. 8 shows a diagram 800 illustrating motion of a sphere 880 on a plane. The sphere 880 may represent the robot 100, 200, or 300. The outer surface 802 of the sphere 880 may represent the outer shell 102. The coordinate frame O 806 denotes the position of the center of mass of the sphere 880 and C 808 denotes the position of its instantaneous contact point c 810. The instantaneous contact point c 810 is where the outer surface 802 contact a contact surface 804. The sphere 880 may move linearly along the y-axis and rotate around the z-axis of frame O. When the sphere 880 rolls on the plane, the outer surface 802 may continuously contact the contact surface 804 at different points of the outer surface 802, i.e. the instantaneous contact point c 810 shifts. Assuming that the contact surface 804 is a flat and smooth surface, the contact surface 804 may define the plane. If no slippage occurs between the outer surface 802 and the contact surface 804, the equations of motion of coordinate frame C 808 in terms of polar coordinates may be expressed as:

$$x_c(t) = x(0) + \int_0^t r_s \omega_{s_x}(t) \sin \theta(t) dt, \tag{3}$$

$$y_c(t) = y(0) + \int_0^t r_s \omega_{s_z}(t) \cos \theta(t) dt, \tag{4}$$

$$\theta(t) = \theta(0) + \int_0^t \omega_{s_z}(t) dt. \tag{5}$$

Figure 9:
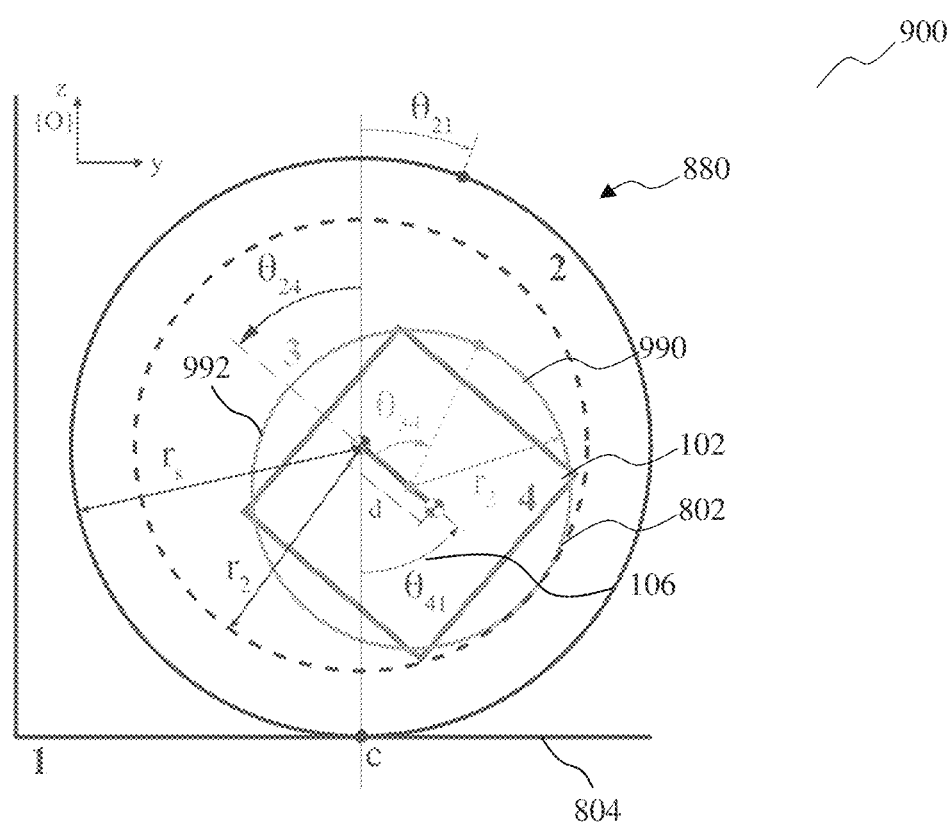
FIG. 9 shows a diagram illustrating the kinematic model of a robot according to various embodiments.

FIG. 9 shows a diagram 900 illustrating the kinematic model of a robot according to various embodiments. The robot may be identical to, or at least substantially similar to any one of the robots 100, 200, 300 or 490. In the diagram 900, the robot is represented by the sphere 880. As the outer shell 102 may be spherical in shape, the kinematics of the cart 106 driving the sphere 880 may be modeled as a hypocyclic gear train, assuming that no slippage occurs between the wheels 120 of the cart 106 and an inner surface 990 of the outer shell 102. The motion of the cart 106 may be modeled as movements of a virtual wheel 992. The contact surface 804 may be denoted as link 1, the inner surface 990 may be denoted as link 2, the virtual wheel 992 may be denoted as link 3, and the cart 106 may be denoted as link 4. The outer surface 802 of the outer shell 102 may contact the contact surface 804. The radius of the sphere 880 may be indicated as $r_s$. The radius of the inner surface 990 may be indicated as $r_2$, also referred herein as inner radius of the outer shell 102. The radius of the virtual wheel 992 may be indicated as $r_3$.

The angular velocity of the virtual wheel 992 measured relative to O, $\dot{\theta}_{31}$ may be expressed as Equation (6). The angular velocity of the outer shell 102 measured relative to O, $\dot{\theta}_{21}$ may be expressed as Equation (7).

$$\dot{\theta}_{31} = \dot{\theta}_{41} - \dot{\theta}_{34}, \tag{6}$$

$$\dot{\theta}_{21} = \dot{\theta}_{41} - \dot{\theta}_{24}, \tag{7}$$

Under a nonslip condition, the distance moved by the outer shell 102 may be equal to the distance moved by the virtual wheel 992, in other words:

$$r_2 \dot{\theta}_{24} = r_3 \dot{\theta}_{34}. \tag{8}$$

This yields the relationship:

$$\frac{\dot{\theta}_{34}}{\dot{\theta}_{24}} = \frac{\dot{\theta}_{34}}{\dot{\theta}_{21} + \dot{\theta}_{41}} = \frac{r_2}{r_3}, \tag{9}$$

and on simplification, the angular velocity of the outer shell 102 may be expressed as:

$$\dot{\theta}_{21} = -\dot{\theta}_{41} + \frac{r_3}{r_2}\dot{\theta}_{34}. \quad (10)$$

The outer shell 102 may also yaw about its z axis by θ, hence its angular velocity expressed relative to O may also be expressed as:

$$\begin{Bmatrix} \omega_{s_x} \\ \omega_{s_y} \\ \omega_{s_z} \end{Bmatrix} = \begin{Bmatrix} \dot{\theta}_{21} \\ 0 \\ \dot{\theta} \end{Bmatrix}. \quad (11)$$

The pitch measurement α from the IMU may give $\dot{\theta}_{41} = \dot{\alpha}$ and the measurements from the left wheel encoder and the right wheel encoder may give $$\dot{\theta}_{34} = \frac{\dot{\theta}_{34,L} + \dot{\theta}_{34,R}}{2}.$$

In other words, the rotational velocity of the virtual wheel 992 may be an average of the velocities of each wheel 120 of the cart 106. Thus, the angular velocity of the outer shell 102 may be obtained to yield the position of frame C based on Equations (10) and (11).

According to various embodiments, the robot may navigate based on pure-pursuit algorithm. The pure-pursuit algorithm may run on the pure-pursuit controller 542. The pure-pursuit algorithm may be a waypoint tracking algorithm. The pure-pursuit algorithm may be understood as adjusting the heading of the robot such that the robot is always looking at and rolling towards the waypoint. As an analogy, pure-pursuit algorithm may be understood to be similar to a fighter pilot trying to keep his aircraft pointed to the tail of a target aircraft during an aerial dogfight, which is trying to keep his aircraft on the vector pointing to the enemy aircraft and pursuing it. The pure-pursuit algorithm may determine the curvature of a path to be followed to reach a goal point on the desired path. The curvature of the path may also be referred herein as a rolling curvature. This goal point may be a point on the path that is one look-ahead distance from the current robot position. An arc that joins the current point and the goal point may be constructed. The chord length of this arc may be the look-ahead distance, and may act as the third constraint in determining a unique arc that joins the two points. The look-ahead distance term may refer to the distance of the target point on the desired path from the current position of the robot. The shorter the look-ahead distance, the smaller the path radius. Vice-versa, the longer the look-ahead distance, the larger the path radius. The pure-pursuit algorithm may be useful in controlling how close the robot is able to follow a trajectory, preventing it from making drastic heading corrections beyond its stable dynamic capabilities.

Figure 10:
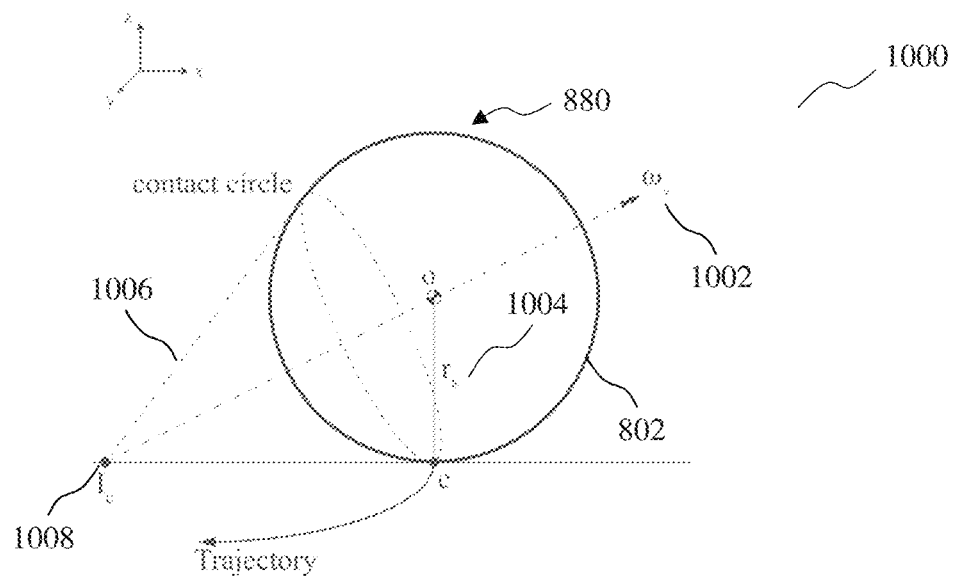
FIG. 10 shows a diagram showing the kinematics of a rolling sphere.

FIG. 10 shows a diagram 1000 showing the kinematics of a rolling sphere 880. The sphere 880 may represent a robot according to various embodiments. The sphere 880 may be driven by a two-wheel differential drive cart 106 directly resulting in an equivalent rolling speed of $\omega_s$ 1002. The radius of the sphere 880 may be denoted as $r_s$ 1004. Forward and turning motion of the sphere 880 may be defined by the instantaneous motion of a right circular cone 1006 rolling on a horizontal surface about an instant center $I_C$ 1008 of the right circular cone 1006. The pure-pursuit controller 542 may determine the look ahead curvature, in other words, the rolling curvature required for the sphere 880 to roll towards a commanded waypoint. The pure-pursuit controller 542 may steer the sphere 880 to move along the look ahead curvature using the pure-pursuit algorithm.

Figure 11:
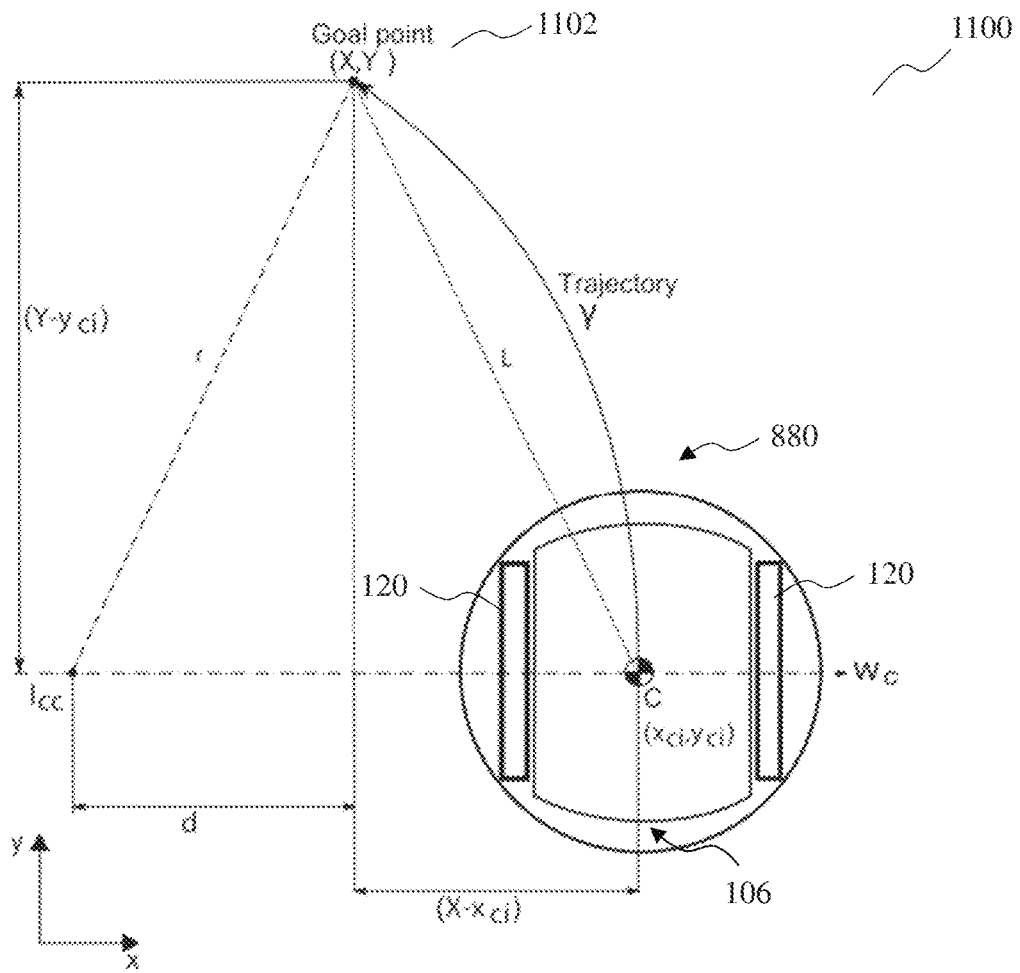
FIG. 11 shows a diagram illustrating the pure-pursuit algorithm applied to the sphere.

FIG. 11 shows a diagram 1100 illustrating the pure-pursuit algorithm applied to the sphere 880. As an example, the sphere 880 may be trying to reach a specified waypoint (X,Y), also referred herein as goal point 1102, from its current contact position ($x_{ci}$, $y_{ci}$). The pure-pursuit algorithm may be implemented by following these steps:

1. Obtain the current position of the sphere 880 ($x_{ci}$, $y_{ci}$).
2. Determine its current look-ahead distance L.
3. Compute the coordinate transform W with its x-axis directed along the projection of $\vec{\omega}_s$ onto the contact plane.
4. Transform the current goal point 1102 (X,Y) into the local frame W.
5. Compute the desired rolling curvature γ, using basic geometry.
6. Steer the sphere 880 to achieve the above rolling curvature based on a desired linear velocity command.

The coordinate transform W that relates the fixed frame F to the projected angular velocity $\vec{\omega}_s$ may be $$[W] = \begin{bmatrix} \cos\theta & -\sin\theta & x_{ci} \\ \sin\theta & \cos\theta & y_{ci} \\ 0 & 0 & 1 \end{bmatrix}. \quad (12)$$

The required rolling curvature for the robot to reach a specified waypoint from its current contact position, may be obtained by solving the following two equations:

$$(X-x_{ci})^2 + (Y-y_{ci})^2 = L^2, \quad (13)$$

$$(X-x_{ci}) + d = r. \quad (14)$$

where r denotes the radius of rolling curvature between current position and the goal point 1102. Denoting $(X-x_{ci})$ as x and $(Y-y_{ci})$ as y, Equations (13) and (14) may be solved to obtain for its rolling curvature, as follows:

$$\gamma = \frac{1}{r} = \frac{2x}{L^2}. \quad (15)$$

Hence, the required steering rate given the rolling curvature and desired linear velocity command may be:

$$\dot{\theta} = r_k \gamma \dot{\theta}_{21}. \quad (16)$$

In the following, an experimental validation of the localization and waypoint tracking performance of the robot according to various embodiments will be described. The experimental validation evaluated the robot localization accuracy and its waypoint tracking performance as compared to the ground truth measured by a high accuracy motion capture system.

Figure 12:
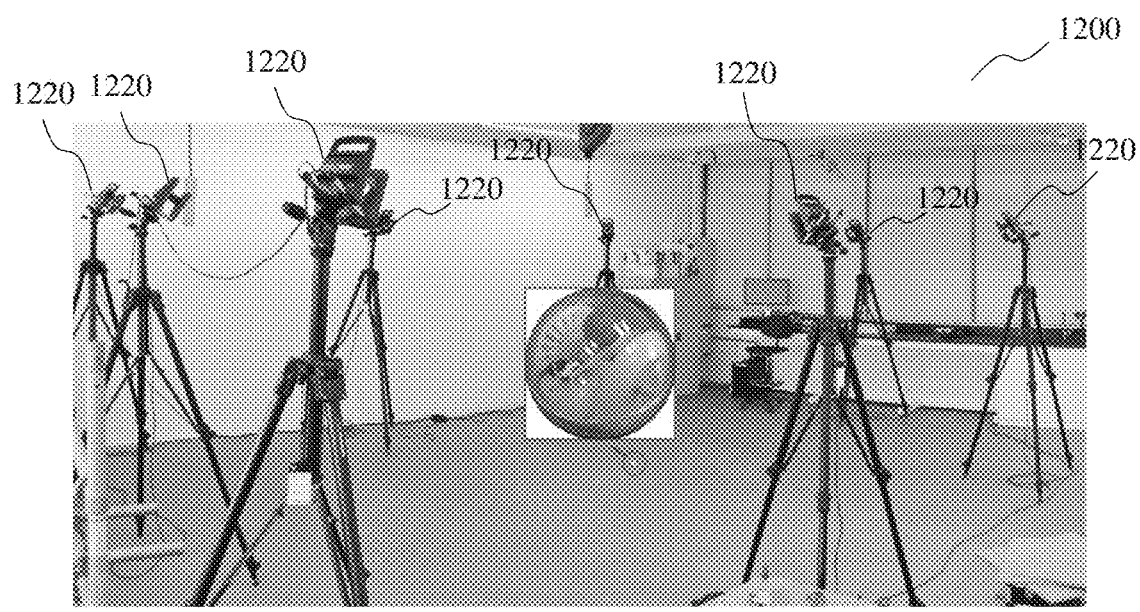
FIG. 12 shows a test set up for performing the experimental validation.

FIG. 12 shows a test set up 1200 for performing the experimental validation. The test set up 1200 included a motion capture system. The motion capture system included eight motion capture cameras 1220 which tracked markers placed on the cart 106 inside the robot. Software of the motion capture system output coordinates of the tracked markers in three dimensional coordinates at 100 Hz with respect to the origin of the motion capture system. This origin has an offset with the origin of the robot's coordinate system which is corrected while plotting the results. Also, the marker being tracked has a finite offset with the robot coordinate system's origin. The finite offset was taken into consideration before the comparison. The results from the motion capture system are considered to be the ground-truth since the system is accurate to 0.1 mm. The ground truth is plotted against the data streamed (via Bluetooth) from the robot to a computer at 50 Hz. The total floor area being tracked by the motion capture system was 3.5 m×5 m, which may be reconfigured as per the test requirement. The accuracy of the kinematic model as derived in Equation (11) was verified, by comparing the output of the localizer 210 of the robot against the ground truth measured by the motion capture system.

Figure 13:
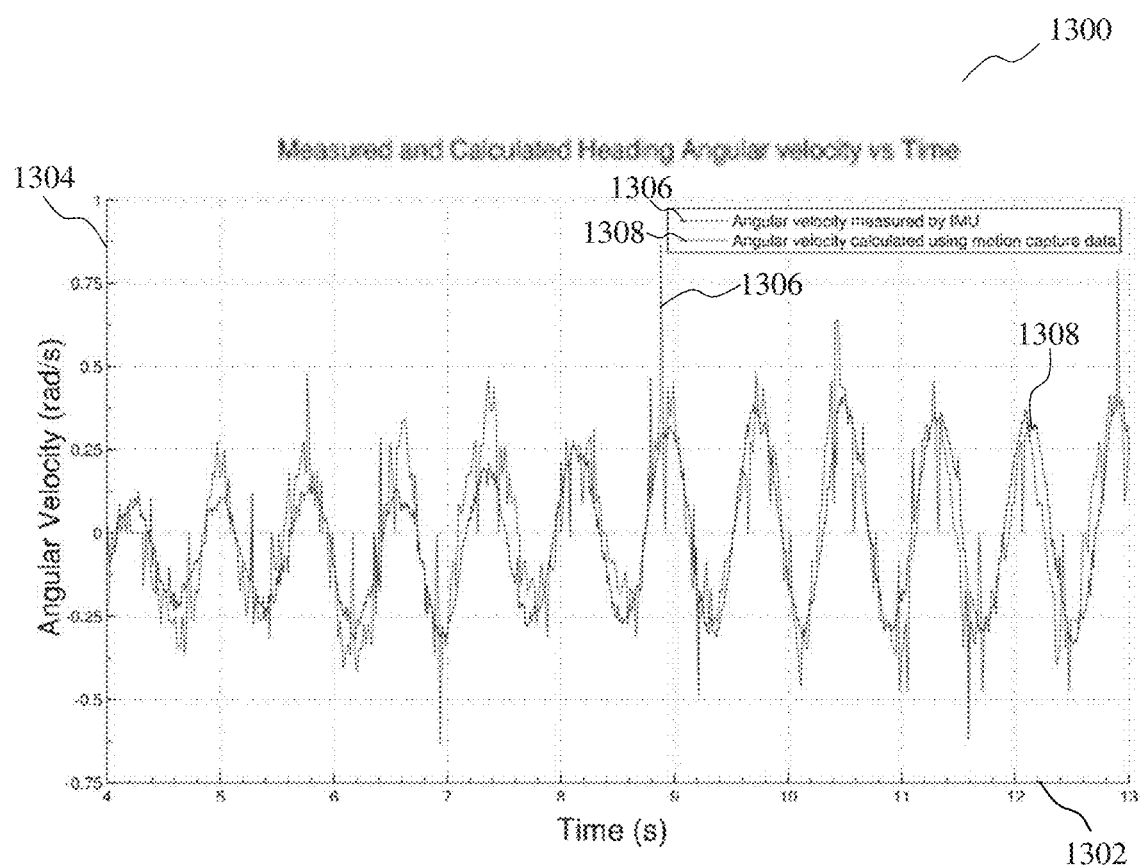
FIG. 13 shows a graph that plots the IMU measurements and the angular velocity calculated using the motion capture data.

FIG. 13 shows a graph 1300 that plots the IMU measurements and the angular velocity calculated using the motion capture data. The graph 1300 includes a horizontal axis 1302 that indicates time in seconds, and a vertical axis 1304 that indicates angular velocity in radians per second. The graph 1300 includes a first plot 1306 of the IMU measurements, and a second plot 1308 of the angular velocity $\omega_{sz}$ calculated as the spherical rolling robot was performing a straight-line trajectory. The first plot 1306 shows the raw IMU measurements, i.e. the output of the encoders 520a, 520b. The graph 1300 shows that the first plot 1306 is substantially consistent with the second plot 1308, and therefore, the kinematic model of $\omega_{sz}$ is valid.

To verify $\omega_{sx}$, the displacement of the robot as estimated by the localizer 210 was compared against the displacement of the robot as measured by the motion capture system, over ten straight line test trails.

Figure 14:
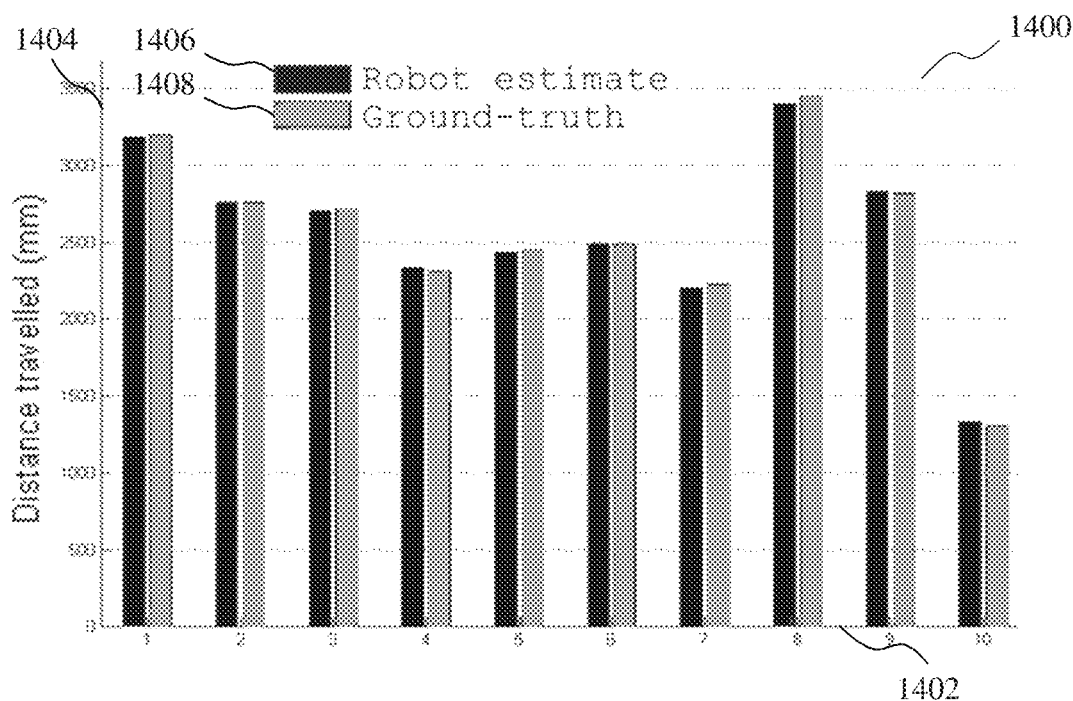
FIG. 14 show a bar chart that shows the measured and calculated displacement as estimated by the kinematic model of $\omega_{sx}$.

FIG. 14 show a bar chart 1400 that shows the measured and calculated displacement as estimated by the kinematic model of $\omega_{sx}$. The bar chart 1400 includes a horizontal axis 1402 that indicates the trial number, and a vertical axis 1404 that indicates the distance travelled in millimeters. The bar chart 1400 includes a robot estimate 1406 and a ground-truth 1408 for each trial. The bar chart 1400 shows that the robot estimate 1406, i.e. the predicted displacement, is very close to the ground truth 1408, for all ten trials.

Figure 15A:
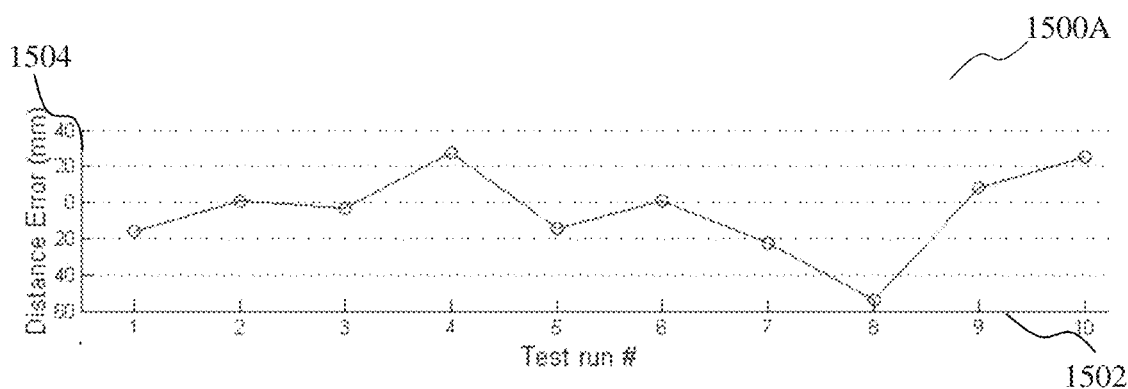
FIG. 15A shows a graph that plots the error of the robot estimate against the trial number.

FIG. 15A shows a graph 1500A that plots the error of the robot estimate 1406 against the trial number. The graph 1500A includes a horizontal axis 1502 indicating the trial number, also referred herein as test run number; and a vertical axis 1504 indicating the distance error in millimeters. The error is less than 30 mm in all of the 10 trials.

Figure 15B:
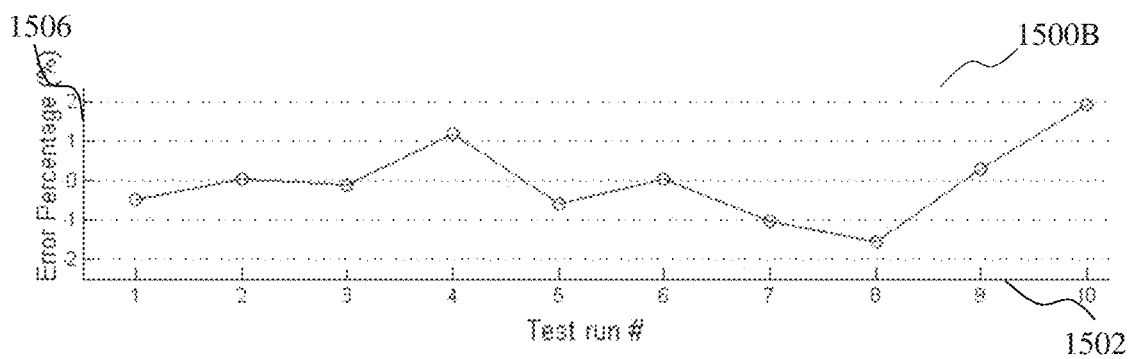
FIG. 15B shows a graph that plots the error percentage of the robot estimate against the trial number.

FIG. 15B shows a graph 1500B that plots the error percentage of the robot estimate 1406 against the trial number. The graph 1500B includes the horizontal axis 1502, and a vertical axis 1506 that indicates the error percentage. The error of the robot estimate, in other words, the difference between the robot estimate and the ground-truth, was generally under 2%. Therefore, the kinematic model for $\omega_{sx}$ was verified.

Figure 16:
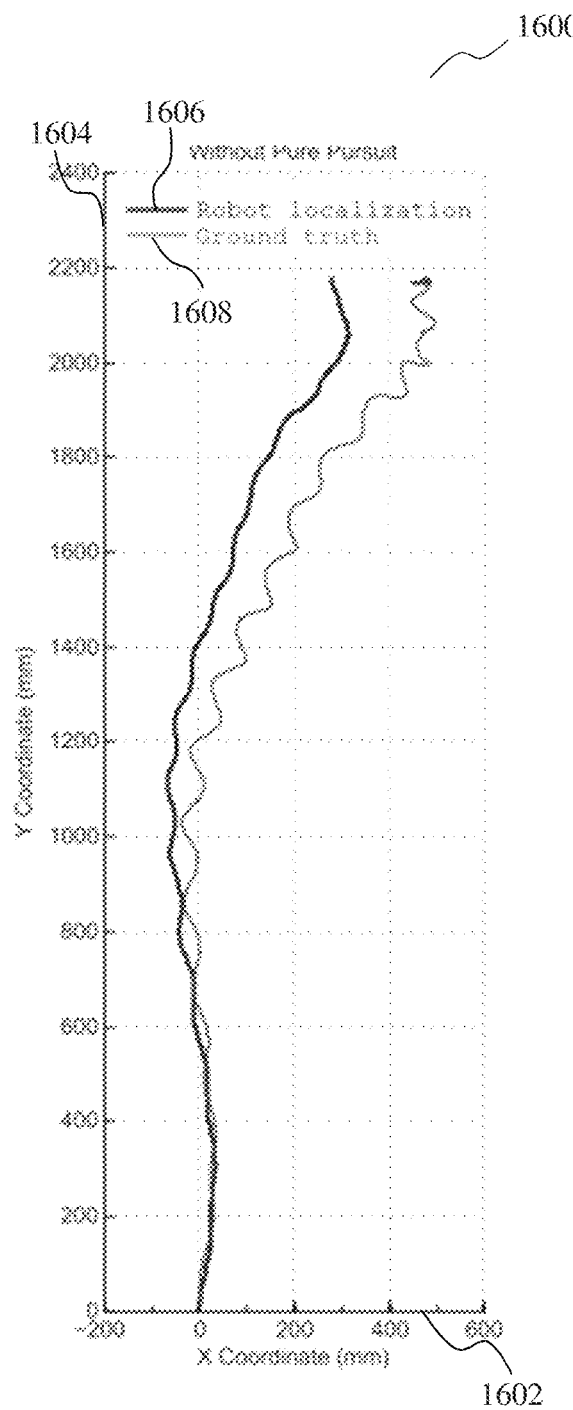
FIG. 16 shows a graph that shows the measured and estimated trajectory of the spherical robot without pure-pursuit implementation.

FIG. 16 shows a graph 1600 that shows the measured and estimated trajectory of the spherical robot without pure-pursuit implementation. The graph 1600 includes a horizontal axis 1602 that indicates the x-coordinate in millimeters, and a vertical axis 1604 that indicates the y-coordinate in millimeters. The graph 1600 includes a first plot 1606 that represents the robot's estimated trajectory, and a second plot 1608 that represents the measured trajectory, in other words, the ground truth of the robot. The second plot 1608 exhibits more waviness compared to the first plot 1606 due to the marker not being placed at the center of mass of the spherical robot.

Figure 17:
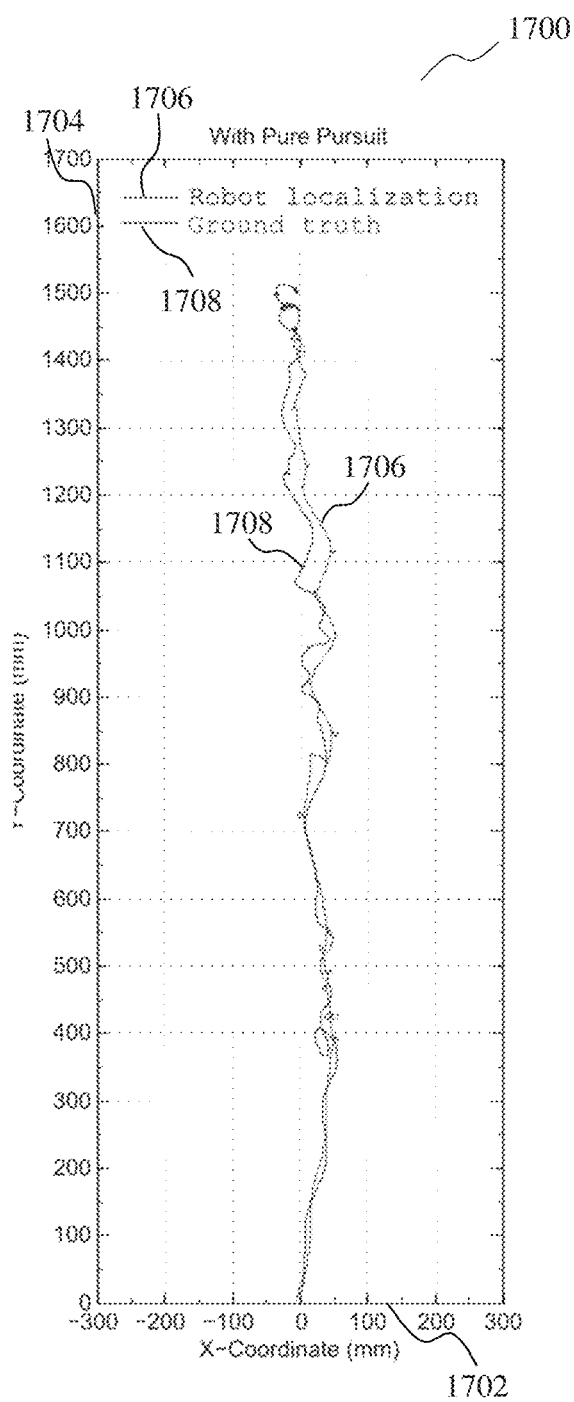
FIG. 17 shows a graph that shows the measured and estimated trajectory of the robot with pure-pursuit implementation.

FIG. 17 shows a graph 1700 that shows the measured and estimated trajectory of the robot with pure-pursuit implementation. The graph 1700 includes a horizontal axis 1702 that indicates the x-coordinate in millimeters, and a vertical axis 1704 that indicates the y-coordinate in millimeters. The graph 1700 includes a first plot 1706 that represents the robot's estimated trajectory, and a second plot 1708 that represents the measured trajectory, in other words, the ground truth of the robot. The graph 1700 shows that the first plot 1706 and the second plot 1708 are more closely aligned, as compared to the first plot 1606 and the second plot 1608. Therefore, the graphs 1600 and 1700 show that the robot deviates less from its desired waypoint with the implementation of the pure-pursuit algorithm.

According to various embodiments, the robot may be capable of performing real-time waypoint tracking and accurate localization, using only data from an IMU and wheel encoders. The experiment described above proved that the kinematic model used for localization and the tracking performance of the robot are acceptable for flat surface conditions. The robot may be used in industrial or commercial applications. For example, the robot may be implemented as part of autonomous toys for hobbyists or children. The robot may also be used as a military equipment, such as a surveillance platform or even part of a swarming autonomous system. The robot may be deployed in hazardous environments. The robot may also be used as a security device, for example part of a home security system, a closed-circuit television or a mobile surveillance device.

Figure 18:
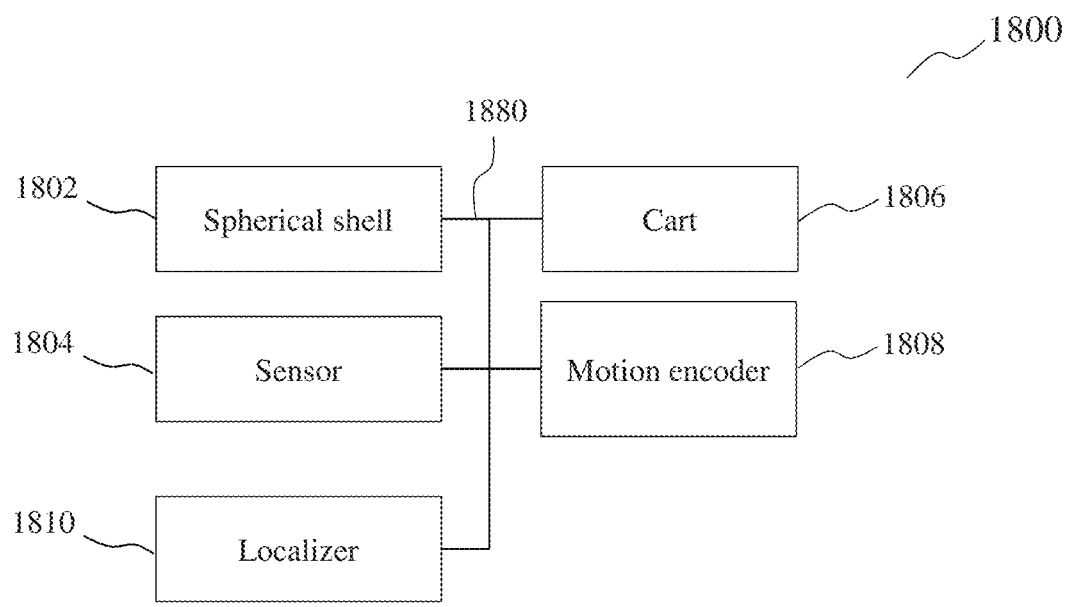
FIG. 18 shows a conceptual diagram of a robot according to various embodiments.

FIG. 18 shows a conceptual diagram of a robot 1800 according to various embodiments. The robot 1800 may include a spherical shell 1802, a sensor 1804, a cart 1806, a motion encoder 1808 and a localizer 1810. The cart 1806 may be arranged in the spherical shell 1802. The cart 1806 may include a plurality of wheels. The plurality of wheels may be rotatable to move the cart 1806 along an inner surface of the spherical shell 1802. The sensor 1804 may be coupled to the cart. The sensor 1804 may be configured to provide an inertial measurement of the cart 1806. The motion encoder 1808 may be configured to measure an angular velocity of each wheel of the plurality of wheels. The localizer 1810 may be configured to determine a location of the robot 1800, based on the angular velocities of the plurality of wheels and the inertial measurement of the cart 1806. The spherical shell 1802, sensor 1804, cart 1806, motion encoder 1808 and localizer 1810 may be coupled with each other, like indicated by lines 1880, for example electrically coupled, for example using a line or a cable, and/or mechanically coupled.

In other words, according to various embodiments, a robot 1800 may be a spherical rolling robot. The robot 1800 may be identical to, or at least substantially similar to, any one of the robots 100, 200, 300 or 490. The robot 1800 may include a spherical shell 1802 that encloses a cart 1806, a sensor 1804, a motion encoder 1808 and a localizer 1810. The spherical shell 1802 may be identical to, or at least substantially similar to the outer shell 102. The cart 1806 may be identical to, or at least substantially similar to the cart 106. The cart 1806 may be constantly in contact with the inner surface of the spherical shell 1802. To prevent slippage of the cart 1806 on the inner surface, at least one of the surface of the cart 1806 in contact with the inner or the inner surface itself, may be at least substantially rough. The cart 1806 may include a plurality of wheels. The wheels may be identical to, or at least substantially similar to the wheels 120. For example, the cart 1806 may include a left wheel 120a and a right wheel 120b. The cart 1806 may alternatively include three wheels, four wheels or more. The cart 1806 may move along an inner surface of the spherical shell 1802 when the plurality of wheels rotate. The plurality of wheels may contact the inner surface of the spherical shell 1802 at all times. The sensor 1804 may be coupled to the cart 1806, so as to determine the inertial measurement, i.e. pose of the cart 1806. The sensor 1804 may be identical to, or at least substantially similar to the sensor 204, the IMU motion sensing block 430 or the IMU 504. The sensor 1804 may include an inertial measurement unit. The sensor 1804 may further include a moving average band pass filter. The moving average bandpass filter may be configured to smoothen the readings from the inertial measurement unit to generate the inertial measurement. The motion encoder 1808 may be identical to, or at least substantially similar to the motion encoder 208 or the encoder block 460. The motion encoder 1808 may include a plurality of wheel encoders. The wheel encoders may be identical to, or at least substantially similar to the wheel encoders 218, the encoder unit 462 or the left wheel encoder 520a and right wheel encoder 520b. Each wheel encoder may be coupled to a respective wheel of the plurality of wheels. Each wheel encoder may measure an angular velocity of the respective wheel. Each wheel encoder may include a line sensor configured to generate an analog signal upon sensing a reflective surface. The robot may further include an encoder filter configured to convert the analog signal into digital pulses based on a differential of the analog signal. The localizer 1810 may determine the location of the robot 1800 based on the angular velocities measured by the wheel encoders, and further based on the inertial measurement from the sensor 1804. The localizer 1810 may be identical to, or at least substantially similar to the localizer 210 or the kinematic localization block 510. The localizer 1810 may be part of the circuit board 130, the processor block 440 or the embedded controller 442.

Figure 19:
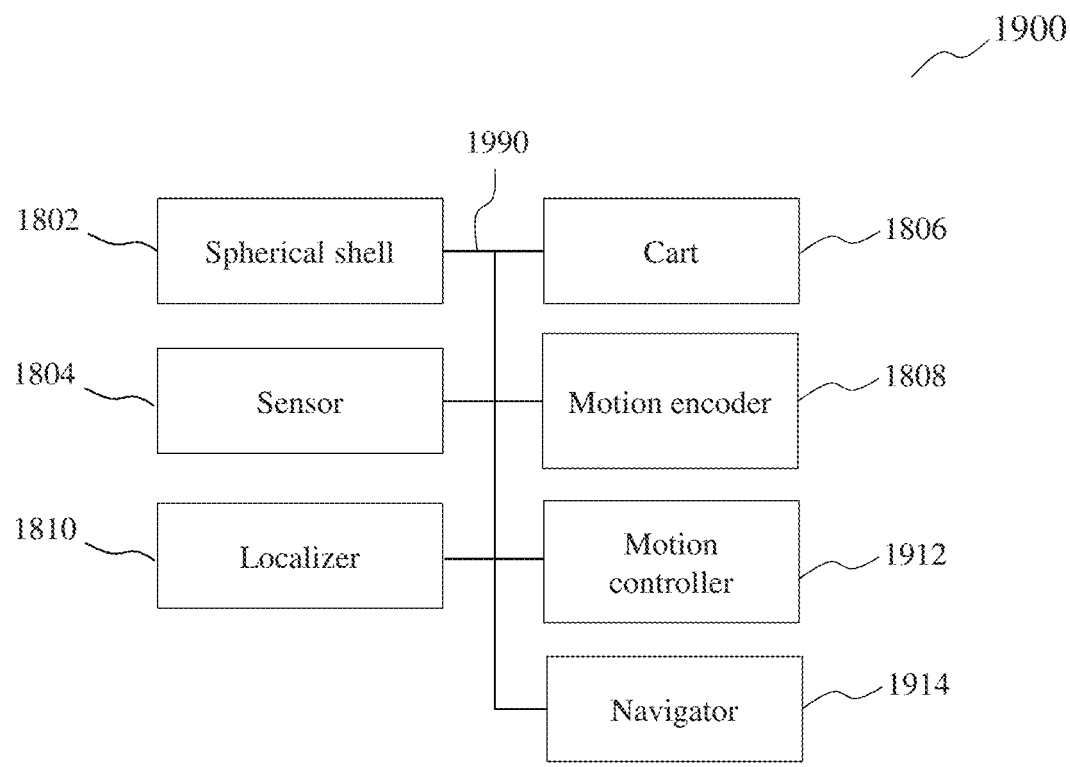
FIG. 19 shows a conceptual diagram of a robot according to various embodiments.

FIG. 19 shows a conceptual diagram of a robot 1900 according to various embodiments. The robot 1900 may be similar to the robot 1800. Compared to the robot 1800, the robot 1900 may further include a motion controller 1912 and a navigator 1914. The motion controller 1912 may include the actuation block 450, the wheel controllers 554a, 554b, the motor drivers 556a, 556b and/or the motors 524a, 524b. The motors may be configured to overcome friction between the inner surface of the spherical shell 1802 and a surface of the cart 1806 in contact with the inner surface, so as to move the cart 1806 relative to the inner surface. The motion controller 1912 may be configured to independently control each wheel of the plurality of wheels. As such, the cart 1806 may change its direction of motion by having its wheels move at different velocities. The navigator 1914 may be identical to, or at least substantially similar to, the pure-pursuit controller 542. The navigator 1914 may be part of the circuit board 130, the processor block 440 or the embedded controller 442. The navigator 1914 may be configured to determine motion parameters of the spherical shell 1802 that is required to reach a desired location, or waypoint. The motion parameters may include a rolling curvature of the spherical shell 1802. The navigator 1914 may use pure-pursuit algorithm to determine the required motion parameters. The motion controller 1912 may be configured to control each wheel of the cart 1806 based on the motion parameters as determined by the navigator 1914. The motion parameters may include a rolling curvature of the spherical shell 1802. The spherical shell 1802, sensor 1804, cart 1806, motion encoder 1808, localizer 1810, motion controller 1912 and navigator 1914 may be coupled with each other, like indicated by lines 1990, for example electrically coupled, for example using a line or a cable, and/or mechanically coupled.

Figure 20:
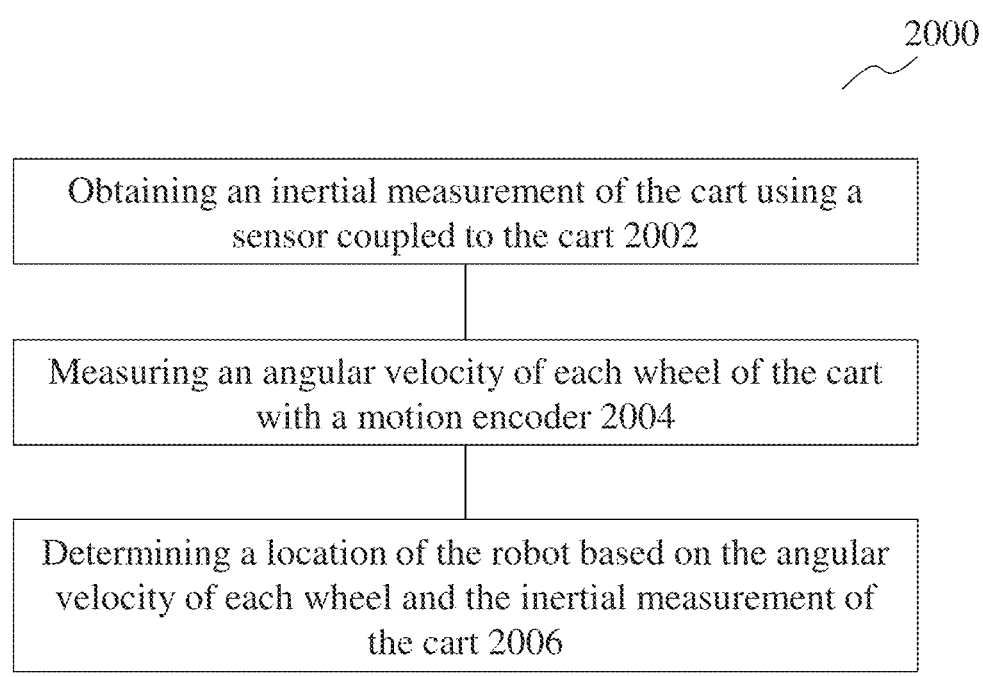
FIG. 20 shows a flow diagram of a method for localizing a robot comprising a cart in a spherical shell, according to various embodiments.

FIG. 20 shows a flow diagram of a method 2000 for localizing a robot comprising a cart in a spherical shell, according to various embodiments. The method 2000 may include obtaining an inertial measurement of the cart using a sensor coupled to the cart 2002; measuring an angular velocity of each wheel of the cart with a motion encoder 2004; and determining a location of the robot based on the angular velocity of each wheel and the inertial measurement of the cart 2006.

The following examples pertain to further embodiments.

Example 1 is a robot including: a spherical shell; a cart located in the spherical shell, the cart including a plurality of wheels rotatable to move the cart along an inner surface of the spherical shell; a sensor coupled to the cart, the sensor configured to provide an inertial measurement of the cart; a motion encoder configured to measure an angular velocity of each wheel of the plurality of wheels; and a localizer configured to determine a location of the robot, based on the angular velocities of the plurality of wheels and the inertial measurement of the cart.

In example 2, the subject matter of example 1 may further include a motion controller configured to independently control each wheel of the plurality of wheels.

In example 3, the subject matter of example 1 or example 2 may further include that the motion encoder includes a plurality of wheel encoders, wherein each wheel encoder includes a line sensor configured to generate an analog signal upon sensing a reflective surface.

In example 4, the subject matter of example 3 may further include an encoder filter configured to convert the analog signal into digital pulses.

In example 5, the subject matter of example 4 may further include that the encoder filter is configured to convert the analog signal into digital pulses based on a differential of the analog signal.

In example 6, the subject matter of any one of examples 1 to 5 may further include that the inertial measurement includes yaw and pitch of the cart.

In example 7, the subject matter of any one of examples 1 to 6 may further include that the localizer is configured to determine the location of the robot further based on an angular velocity of the spherical shell.

In example 8, the subject matter of example 7 may further include that the localizer is configured to determine the angular velocity of the spherical shell based on an inner radius of the spherical shell, radius of each wheel of the plurality of wheels and angular velocities of each wheel of the plurality of wheels.

In example 9, the subject matter of any one of examples 1 to 8 may further include that the cart is constantly in contact with the inner surface of the spherical shell.

In example 10, the subject matter of any one of examples 1 to 9 may further include that the sensor includes an inertial measurement unit and a moving average bandpass filter.

In example 11, the subject matter of example 10 may further include that the moving average bandpass filter is configured to generate the inertial measurement based on readings from the inertial measurement unit.

In example 12, the subject matter of any one of examples 1 to 11 may further include a navigator configured to determine motion parameters of the spherical shell required to reach a desired location, based on the determined location.

In example 13, the subject matter of example 12 may further include that the motion parameters include a rolling curvature of the spherical shell.

In example 14, the subject matter of example 12 or example 13 may further include that the navigator is configured to determine the motion parameters based on pure-pursuit algorithm.

In example 15, the subject matter of any one of examples 12 to 14 may further include a motion controller configured to control each wheel of the plurality of wheels based on the determined motion parameters.

In example 16, the subject matter of any one of examples 1 to 15 may further include that at least one of a surface of the cart in contact with the inner surface of the spherical shell or the inner surface of the spherical shell is at least substantially rough.

In example 17, the subject matter of any one of examples 1 to 16 may further include that the cart includes a motor configured to drive the cart to overcome friction between the inner surface of the spherical shell and a surface of the cart in contact with the inner surface of the spherical shell.

Example 18 may include a method for localizing a robot including a cart in a spherical shell, the method including: obtaining an inertial measurement of the cart using a sensor coupled to the cart; measuring an angular velocity of each wheel of the cart with a motion encoder; and determining a location of the robot based on the angular velocity of each wheel and the inertial measurement of the cart.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

The invention claimed is:

1. A robot, comprising:
   a spherical shell less than 150 mm in diameter;
   a non-holonomic cart located in the spherical shell, the non-holonomic cart comprising a plurality of wheels rotatable to move the non-holonomic cart along an inner surface of the spherical shell;
   a sensor coupled to the non-holonomic cart, the sensor configured to provide an inertial measurement of the non-holonomic cart;
   a motion encoder configured to measure an angular velocity of each wheel of the plurality of wheels;
   a localizer configured to determine a spatial location of the robot along a trajectory, based on the measured angular velocities of the plurality of wheels and the inertial measurement of the non-holonomic cart; and
   a navigator configured to determine motion parameters of the spherical shell required to reach a desired location based on the determined spatial location of the robot.

2. The robot of claim 1, wherein the inertial measurement comprises yaw and pitch of the non-holonomic cart.

3. The robot of claim 1, wherein the localizer is configured to determine the location of the robot further based on an angular velocity of the spherical shell.

4. The robot of claim 3, wherein the localizer is configured to determine the angular velocity of the spherical shell based on an inner radius of the spherical shell, radius of each wheel of the plurality of wheels and angular velocities of each wheel of the plurality of wheels.

5. The robot of claim 1, wherein the non-holonomic cart is constantly in contact with the inner surface of the spherical shell.

6. The robot of claim 1, wherein the sensor comprises an inertial measurement unit and a moving average bandpass filter.

7. The robot of claim 6, wherein the moving average bandpass filter is configured to generate the inertial measurement based on readings from the inertial measurement unit.

8. The robot of claim 1, wherein the motion parameters comprise a rolling curvature of the spherical shell.

9. The robot of claim 1, wherein at least one of a surface of the non-holonomic cart in contact with the inner surface of the spherical shell or the inner surface of the spherical shell is rough.

10. The robot of claim 1, wherein the non-holonomic cart comprises a motor configured to drive the non-holonomic cart to overcome friction between the inner surface of the spherical shell and a surface of the non-holonomic cart in contact with the inner surface of the spherical shell.

11. The robot of claim 1, wherein the navigator is configured to determine the motion parameters of the spherical shell required to reach a desired location based on the determined spatial location of the robot using pure-pursuit algorithm.

12. The robot of claim 1, further comprising:
   a motion controller configured to control each wheel of the plurality of wheels based on the determined motion parameters.

13. The robot of claim 1,
   wherein the motion encoder comprises a plurality of wheel encoders, an analog-digital converter, and an encoder filter,
   wherein each wheel encoder comprises a line sensor configured to generate an analog signal upon sensing a reflective surface,
   wherein the analog-digital converter is configured to generate a raw encoder signal based on the analog signal, and
   wherein the encoder filter is configured to determine rates of change in the raw encoder signal, and is further configured to generate a digital signal based on the determined rates of change.

14. The robot of claim 1, having a mass of less than 150 grams.

15. The robot of claim 1, wherein the localizer is configured to determine a velocity of the spherical shell based on the inertial measurement and further based on the measured angular velocities of the plurality of wheels, and wherein the localizer is configured to determine the spatial location of the robot based on the determined velocity of the spherical shell and further based on the inertial measurement.

16. A method for localizing a robot comprising a non-holonomic cart in a spherical shell, the method comprising:
   obtaining an inertial measurement of the non-holonomic cart using a sensor coupled to the non-holonomic cart;
   measuring an angular velocity of each wheel of the non-holonomic cart with a motion encoder, wherein the motion encoder comprises a plurality of wheel encoders, an analog-digital converter and an encoder filter, each wheel encoder comprising a line sensor;

determining a spatial location of the robot along a trajectory based on the measured angular velocity of each wheel and the inertial measurement of the non-holonomic cart; and determining motion parameters of the spherical shell required to reach a desired location based on the determined spatial location of the robot, wherein the spherical shell is 150 mm in diameter.

* * * * *